United States Patent
Burger et al.

(10) Patent No.: US 9,665,854 B1
(45) Date of Patent: May 30, 2017

(54) AUTHENTICATION ALERTS

(75) Inventors: Michael Burger, Aliso Viejo, CA (US); Michael John Dean, Torrance, CA (US); Mark Joseph Kapczynski, Santa Monica, CA (US); Nelson Yu, El Monte, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 13/524,920

(22) Filed: Jun. 15, 2012

Related U.S. Application Data

(60) Provisional application No. 61/497,826, filed on Jun. 16, 2011, provisional application No. 61/504,955, filed on Jul. 6, 2011, provisional application No. 61/540,654, filed on Sep. 29, 2011.

(51) Int. Cl.
G06Q 40/00 (2012.01)
G06Q 20/00 (2012.01)

(52) U.S. Cl.
CPC ................... *G06Q 20/00* (2013.01)

(58) Field of Classification Search
USPC .................................................. 705/35–45
See application file for complete search history.

(56) References Cited

U.S. PATENT DOCUMENTS

| | | | |
|---|---|---|---|
| 3,405,457 A | 10/1968 | Bitzer | |
| 4,346,442 A | 8/1982 | Musmanno | |
| 4,734,858 A | 3/1988 | Schlafly | |
| 4,755,940 A | 7/1988 | Brachtl et al. | |
| 4,774,664 A | 9/1988 | Campbell et al. | |
| 4,795,890 A | 1/1989 | Goldman | |

(Continued)

FOREIGN PATENT DOCUMENTS

| | | |
|---|---|---|
| EP | 0 542 298 | 5/1993 |
| EP | 1 028 401 | 8/2000 |

(Continued)

OTHER PUBLICATIONS

Chores & Allowances. "Do Kids Have Credit Reports?", Oct. 15, 2007, http://choresandallowances.blogspot.com/2007/10/do-kids-have-credit-reports.html, pp. 5.

(Continued)

*Primary Examiner* — Chika Ojiaku
(74) *Attorney, Agent, or Firm* — Knobbe, Martens, Olson & Bear, LLP

(57) ABSTRACT

Methods and systems are provided for generating alerts in association with a request to open an account for an individual. For example, information identifying an individual may be received from a financial entity in association with the financial entity receiving a request to open an account for the individual from a requesting entity. The requesting entity may be a vendor or service provider associated with the financial entity. An electronic notification may then be sent to the individual, which may include a selectable option to indicate that the individual does not authorize opening of the account. In response to receiving an indication that the individual does not authorize opening of the account, notifications may be sent to both the financial entity and the requesting entity indicating that the individual has not authorized opening of the account.

13 Claims, 8 Drawing Sheets

(56) References Cited

U.S. PATENT DOCUMENTS

| | | | |
|---|---|---|---|
| 4,891,503 A | 1/1990 | Jewell | |
| 4,977,595 A | 12/1990 | Ohta et al. | |
| 4,989,141 A | 1/1991 | Lyons et al. | |
| 5,126,936 A * | 6/1992 | Champion | G06Q 40/02 705/36 R |
| 5,148,365 A | 9/1992 | Dembo | |
| 5,220,501 A | 6/1993 | Lawlor et al. | |
| 5,274,547 A | 12/1993 | Zoffel et al. | |
| 5,336,870 A | 8/1994 | Hughes et al. | |
| 5,351,293 A | 9/1994 | Michener et al. | |
| 5,383,113 A | 1/1995 | Kight et al. | |
| 5,404,518 A | 4/1995 | Gilbertson et al. | |
| 5,500,513 A | 3/1996 | Langhans et al. | |
| 5,590,038 A | 12/1996 | Pitroda | |
| 5,592,560 A | 1/1997 | Deaton et al. | |
| 5,640,577 A | 6/1997 | Scharmer | |
| 5,659,725 A | 8/1997 | Levy et al. | |
| 5,659,731 A | 8/1997 | Gustafson | |
| 5,715,314 A | 2/1998 | Payne et al. | |
| 5,719,941 A | 2/1998 | Swift et al. | |
| 5,739,512 A | 4/1998 | Tognazzini | |
| 5,754,632 A | 5/1998 | Smith | |
| 5,819,234 A | 10/1998 | Slavin et al. | |
| 5,832,068 A | 11/1998 | Smith | |
| 5,842,211 A | 11/1998 | Horadan et al. | |
| 5,844,218 A | 12/1998 | Kawan et al. | |
| 5,878,403 A | 3/1999 | DeFrancesco | |
| 5,881,131 A | 3/1999 | Farris et al. | |
| 5,884,302 A | 3/1999 | Ho | |
| 5,903,830 A | 5/1999 | Joao et al. | |
| 5,903,881 A | 5/1999 | Schrader et al. | |
| 5,956,693 A | 9/1999 | Geerlings | |
| 5,963,939 A | 10/1999 | McCann et al. | |
| 5,966,695 A | 10/1999 | Melchione et al. | |
| 5,978,780 A | 11/1999 | Watson | |
| 5,995,947 A | 11/1999 | Fraser et al. | |
| 5,999,596 A | 12/1999 | Walker et al. | |
| 6,006,333 A | 12/1999 | Nielsen | |
| 6,009,415 A | 12/1999 | Shurling et al. | |
| 6,021,397 A | 2/2000 | Jones et al. | |
| 6,021,943 A | 2/2000 | Chastain | |
| 6,026,440 A | 2/2000 | Shrader et al. | |
| 6,038,551 A | 3/2000 | Barlow et al. | |
| 6,064,990 A | 5/2000 | Goldsmith | |
| 6,072,894 A | 6/2000 | Payne | |
| 6,073,106 A | 6/2000 | Rozen et al. | |
| 6,073,140 A | 6/2000 | Morgan et al. | |
| 6,085,242 A | 7/2000 | Chandra | |
| 6,088,686 A | 7/2000 | Walker et al. | |
| 6,119,103 A | 9/2000 | Basch et al. | |
| 6,128,602 A | 10/2000 | Northington et al. | |
| 6,149,441 A | 11/2000 | Pellegrino et al. | |
| 6,157,707 A | 12/2000 | Baulier et al. | |
| 6,161,139 A | 12/2000 | Win et al. | |
| 6,178,420 B1 | 1/2001 | Sassano | |
| 6,182,068 B1 | 1/2001 | Culliss | |
| 6,182,229 B1 | 1/2001 | Nielsen | |
| 6,202,053 B1 | 3/2001 | Christiansen et al. | |
| 6,233,566 B1 | 5/2001 | Levine et al. | |
| 6,247,000 B1 * | 6/2001 | Hawkins | G06Q 40/04 705/37 |
| 6,253,202 B1 | 6/2001 | Gilmour | |
| 6,254,000 B1 | 7/2001 | Degen et al. | |
| 6,263,447 B1 | 7/2001 | French et al. | |
| 6,269,369 B1 | 7/2001 | Robertson | |
| 6,282,658 B2 | 8/2001 | French et al. | |
| 6,304,860 B1 | 10/2001 | Martin et al. | |
| 6,311,169 B2 | 10/2001 | Duhon | |
| 6,321,339 B1 | 11/2001 | French et al. | |
| 6,327,578 B1 | 12/2001 | Linehan | |
| 6,330,551 B1 | 12/2001 | Burchetta et al. | |
| 6,343,279 B1 | 1/2002 | Bissonette et al. | |
| 6,353,778 B1 | 3/2002 | Brown | |
| 6,356,937 B1 | 3/2002 | Montville et al. | |
| 6,384,844 B1 | 5/2002 | Stewart et al. | |
| 6,386,444 B1 | 5/2002 | Sullivan | |
| 6,397,197 B1 | 5/2002 | Gindlesperger | |
| 6,397,212 B1 | 5/2002 | Biffar | |
| 6,421,675 B1 | 7/2002 | Ryan et al. | |
| 6,421,729 B1 | 7/2002 | Paltenghe et al. | |
| 6,422,462 B1 | 7/2002 | Cohen | |
| 6,453,353 B1 | 9/2002 | Win et al. | |
| 6,457,012 B1 | 9/2002 | Jatkowski | |
| 6,463,533 B1 | 10/2002 | Calamera et al. | |
| 6,473,740 B2 | 10/2002 | Cockrill et al. | |
| 6,496,936 B1 | 12/2002 | French et al. | |
| 6,523,021 B1 | 2/2003 | Monberg et al. | |
| 6,523,041 B1 | 2/2003 | Morgan et al. | |
| 6,539,377 B1 | 3/2003 | Culliss | |
| 6,539,392 B1 | 3/2003 | Rebane | |
| 6,543,683 B2 | 4/2003 | Hoffman | |
| 6,564,210 B1 | 5/2003 | Korda et al. | |
| 6,571,236 B1 | 5/2003 | Ruppelt | |
| 6,574,736 B1 | 6/2003 | Andrews | |
| 6,581,025 B2 | 6/2003 | Lehman | |
| 6,581,059 B1 | 6/2003 | Barrett et al. | |
| 6,587,841 B1 | 7/2003 | DeFrancesco | |
| 6,601,173 B1 | 7/2003 | Mohler | |
| 6,615,193 B1 | 9/2003 | Kingdon et al. | |
| 6,629,245 B1 | 9/2003 | Stone et al. | |
| 6,647,383 B1 | 11/2003 | August et al. | |
| 6,658,393 B1 | 12/2003 | Basch et al. | |
| 6,665,715 B1 | 12/2003 | Houri | |
| 6,678,694 B1 | 1/2004 | Zimmermann et al. | |
| 6,703,930 B2 | 3/2004 | Skinner | |
| 6,714,944 B1 | 3/2004 | Shapiro et al. | |
| 6,725,381 B1 | 4/2004 | Smith et al. | |
| 6,734,886 B1 | 5/2004 | Hagan et al. | |
| 6,745,938 B2 | 6/2004 | Sullivan | |
| 6,750,985 B2 | 6/2004 | Rhoads | |
| 6,754,665 B1 | 6/2004 | Futagami et al. | |
| 6,766,327 B2 | 7/2004 | Morgan, Jr. et al. | |
| 6,766,946 B2 | 7/2004 | Iida et al. | |
| 6,781,608 B1 | 8/2004 | Crawford | |
| 6,782,379 B2 | 8/2004 | Lee | |
| 6,792,088 B2 | 9/2004 | Takeuchi | |
| 6,792,263 B1 | 9/2004 | Kite | |
| 6,796,497 B2 | 9/2004 | Benkert et al. | |
| 6,804,346 B1 | 10/2004 | Mewhinney | |
| 6,805,287 B2 | 10/2004 | Bishop et al. | |
| 6,810,323 B1 | 10/2004 | Bullock et al. | |
| 6,816,850 B2 | 11/2004 | Culliss | |
| 6,816,871 B2 | 11/2004 | Lee | |
| 6,845,448 B1 | 1/2005 | Chaganti et al. | |
| 6,857,073 B2 | 2/2005 | French et al. | |
| 6,871,287 B1 | 3/2005 | Ellingson | |
| 6,892,307 B1 | 5/2005 | Wood et al. | |
| 6,900,731 B2 | 5/2005 | Kreiner et al. | |
| 6,907,408 B2 | 6/2005 | Angel | |
| 6,908,030 B2 | 6/2005 | Rajasekaran et al. | |
| 6,910,624 B1 | 6/2005 | Natsuno | |
| 6,928,487 B2 | 8/2005 | Eggebraaten et al. | |
| 6,934,714 B2 | 8/2005 | Meinig | |
| 6,934,858 B2 | 8/2005 | Woodhill | |
| 6,941,323 B1 | 9/2005 | Galperin | |
| 6,947,989 B2 | 9/2005 | Gullotta et al. | |
| 6,950,807 B2 | 9/2005 | Brock | |
| 6,950,858 B2 | 9/2005 | Ogami | |
| 6,962,336 B2 | 11/2005 | Glass | |
| 6,965,881 B1 | 11/2005 | Brickell et al. | |
| 6,968,319 B1 | 11/2005 | Remington et al. | |
| 6,973,462 B2 | 12/2005 | Dattero et al. | |
| 6,983,381 B2 | 1/2006 | Jerdonek | |
| 6,985,887 B1 | 1/2006 | Sunstein et al. | |
| 6,988,085 B2 | 1/2006 | Hedy | |
| 6,999,941 B1 | 2/2006 | Agarwal | |
| 7,013,315 B1 | 3/2006 | Boothby | |
| 7,016,907 B2 | 3/2006 | Boreham et al. | |
| 7,028,013 B2 | 4/2006 | Saeki | |
| 7,028,052 B2 | 4/2006 | Chapman et al. | |
| 7,039,607 B2 | 5/2006 | Watarai et al. | |
| 7,043,476 B2 | 5/2006 | Robson | |
| 7,046,139 B2 | 5/2006 | Kuhn et al. | |
| 7,058,386 B2 | 6/2006 | McGregor et al. | |

(56) References Cited

U.S. PATENT DOCUMENTS

| | | |
|---|---|---|
| 7,058,817 B1 | 6/2006 | Ellmore |
| 7,059,531 B2 | 6/2006 | Beenau et al. |
| 7,062,475 B1 | 6/2006 | Szabo et al. |
| 7,069,240 B2 | 6/2006 | Spero et al. |
| 7,072,909 B2 | 7/2006 | Polk |
| 7,076,462 B1 | 7/2006 | Nelson et al. |
| 7,085,727 B2 * | 8/2006 | VanOrman ............ G06Q 10/02 194/205 |
| 7,089,594 B2 | 8/2006 | Lal et al. |
| 7,107,241 B1 | 9/2006 | Pinto |
| 7,117,172 B1 | 10/2006 | Black |
| 7,121,471 B2 | 10/2006 | Beenau et al. |
| 7,124,144 B2 | 10/2006 | Christianson et al. |
| 7,154,375 B2 | 12/2006 | Beenau et al. |
| 7,155,739 B2 | 12/2006 | Bari et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,602 B2 | 4/2007 | Jonas |
| 7,209,895 B2 | 4/2007 | Kundtz et al. |
| 7,209,911 B2 | 4/2007 | Boothby et al. |
| 7,218,912 B2 | 5/2007 | Erskine et al. |
| 7,219,107 B2 | 5/2007 | Beringer |
| 7,222,369 B2 | 5/2007 | Vering et al. |
| 7,234,156 B2 | 6/2007 | French et al. |
| 7,234,160 B2 | 6/2007 | Vogel et al. |
| 7,236,950 B2 | 6/2007 | Savage et al. |
| 7,237,267 B2 | 6/2007 | Rayes et al. |
| 7,243,369 B2 | 7/2007 | Bhat et al. |
| 7,246,067 B2 | 7/2007 | Austin et al. |
| 7,246,740 B2 | 7/2007 | Swift et al. |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,303,120 B2 | 12/2007 | Beenau et al. |
| 7,310,611 B2 | 12/2007 | Shibuya et al. |
| 7,310,617 B1 | 12/2007 | Cunningham |
| 7,314,167 B1 | 1/2008 | Kiliccote |
| 7,315,837 B2 | 1/2008 | Sloan et al. |
| 7,328,233 B2 | 2/2008 | Salim et al. |
| 7,330,717 B2 | 2/2008 | Gidron et al. |
| 7,330,835 B2 | 2/2008 | Deggendorf |
| 7,333,635 B2 | 2/2008 | Tsantes et al. |
| 7,340,679 B2 | 3/2008 | Botscheck et al. |
| 7,343,149 B2 | 3/2008 | Benco |
| 7,343,295 B2 | 3/2008 | Pomerance |
| 7,356,516 B2 | 4/2008 | Richey et al. |
| 7,366,694 B2 | 4/2008 | Lazerson |
| 7,370,014 B1 | 5/2008 | Vasavada et al. |
| 7,370,044 B2 | 5/2008 | Mulhern et al. |
| 7,373,324 B1 | 5/2008 | Engin et al. |
| 7,383,988 B2 | 6/2008 | Slonecker, Jr. |
| 7,386,511 B2 | 6/2008 | Buchanan et al. |
| 7,386,786 B2 | 6/2008 | Davis et al. |
| 7,389,913 B2 | 6/2008 | Starrs |
| 7,395,273 B2 | 7/2008 | Khan et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,433,864 B2 | 10/2008 | Malik |
| 7,437,679 B2 | 10/2008 | Uemura et al. |
| 7,444,414 B2 | 10/2008 | Foster et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,467,401 B2 | 12/2008 | Cicchitto |
| 7,475,032 B1 | 1/2009 | Patnode et al. |
| 7,478,157 B2 | 1/2009 | Bohrer et al. |
| 7,479,949 B2 | 1/2009 | Jobs et al. |
| 7,480,631 B1 | 1/2009 | Merced et al. |
| 7,490,356 B2 | 2/2009 | Lieblich et al. |
| 7,503,489 B2 | 3/2009 | Heffez |
| 7,509,117 B2 | 3/2009 | Yum |
| 7,509,278 B2 * | 3/2009 | Jones ................. G06Q 30/0245 705/36 R |
| 7,512,221 B2 | 3/2009 | Toms |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,558,748 B2 | 7/2009 | Ehring et al. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,587,366 B2 | 9/2009 | Grim, III et al. |
| 7,587,368 B2 | 9/2009 | Felsher |
| 7,593,891 B2 | 9/2009 | Kornegay et al. |
| 7,594,019 B2 | 9/2009 | Clapper |
| 7,603,701 B2 | 10/2009 | Gaucas |
| 7,606,725 B2 | 10/2009 | Robertson et al. |
| 7,610,216 B1 | 10/2009 | May et al. |
| 7,610,229 B1 | 10/2009 | Kornegay |
| 7,613,600 B2 | 11/2009 | Krane |
| 7,620,596 B2 | 11/2009 | Knudson et al. |
| 7,620,653 B1 | 11/2009 | Swartz |
| 7,623,844 B2 | 11/2009 | Herrmann et al. |
| 7,630,903 B1 | 12/2009 | Vaidyanathan |
| 7,634,737 B2 | 12/2009 | Beringer et al. |
| 7,640,200 B2 | 12/2009 | Gardner et al. |
| 7,644,035 B1 | 1/2010 | Biffle et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,685,209 B1 | 3/2010 | Norton et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,715,832 B2 | 5/2010 | Zhou |
| 7,720,846 B1 | 5/2010 | Bayliss |
| 7,725,385 B2 | 5/2010 | Royer et al. |
| 7,729,959 B1 | 6/2010 | Wells et al. |
| 7,730,078 B2 | 6/2010 | Schwabe et al. |
| 7,739,139 B2 | 6/2010 | Robertson et al. |
| 7,739,707 B2 | 6/2010 | Sie et al. |
| 7,747,494 B1 | 6/2010 | Kothari et al. |
| 7,747,520 B2 | 6/2010 | Livermore et al. |
| 7,747,521 B2 | 6/2010 | Serio |
| 7,756,789 B2 | 7/2010 | Welker et al. |

(56) References Cited

U.S. PATENT DOCUMENTS

| | | |
|---|---|---|
| 7,761,373 B2 | 7/2010 | Metz |
| 7,761,384 B2 | 7/2010 | Madhogarhia |
| 7,761,568 B1 | 7/2010 | Levi et al. |
| 7,765,148 B2 | 7/2010 | German et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,787,869 B2 | 8/2010 | Rice et al. |
| 7,788,040 B2 | 8/2010 | Haskell et al. |
| 7,792,715 B1 | 9/2010 | Kasower |
| 7,792,725 B2 * | 9/2010 | Booraem ............... G06Q 40/00 705/35 |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,797,725 B2 | 9/2010 | Lunt et al. |
| 7,801,807 B2 | 9/2010 | DeFrancesco et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,814,002 B2 | 10/2010 | DeFrancesco et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,115 B2 | 11/2010 | Weller et al. |
| 7,832,006 B2 | 11/2010 | Chen et al. |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,014 B2 | 12/2010 | Erikson |
| 7,853,493 B2 | 12/2010 | DeBie et al. |
| 7,856,203 B2 | 12/2010 | Lipovski |
| 7,856,386 B2 | 12/2010 | Hazlehurst et al. |
| 7,865,958 B2 | 1/2011 | Lieblich et al. |
| 7,870,066 B2 | 1/2011 | Lin et al. |
| 7,870,078 B2 | 1/2011 | Clark et al. |
| 7,877,304 B1 | 1/2011 | Coulter |
| 7,877,784 B2 | 1/2011 | Chow et al. |
| 7,890,403 B1 | 2/2011 | Smith |
| 7,899,750 B1 | 3/2011 | Klieman et al. |
| 7,908,242 B1 | 3/2011 | Achanta |
| 7,909,246 B2 | 3/2011 | Hogg et al. |
| 7,912,842 B1 | 3/2011 | Bayliss et al. |
| 7,912,865 B2 | 3/2011 | Akerman et al. |
| 7,925,582 B1 | 4/2011 | Kornegay et al. |
| 7,925,982 B2 | 4/2011 | Parker |
| 7,954,698 B1 | 6/2011 | Pliha |
| 7,958,046 B2 | 6/2011 | Doerner et al. |
| 7,966,192 B2 | 6/2011 | Pagliari et al. |
| 7,970,679 B2 | 6/2011 | Kasower |
| 7,975,299 B1 | 7/2011 | Balducci et al. |
| 7,979,908 B2 | 7/2011 | Millwee |
| 7,983,932 B2 | 7/2011 | Kane |
| 7,983,979 B2 | 7/2011 | Holland, IV |
| 7,987,501 B2 | 7/2011 | Miller et al. |
| 7,991,688 B2 | 8/2011 | Phelan et al. |
| 8,001,153 B2 | 8/2011 | Skurtovich, Jr. et al. |
| 8,001,235 B2 | 8/2011 | Russ et al. |
| 8,006,261 B1 | 8/2011 | Haberman et al. |
| 8,032,932 B2 | 10/2011 | Speyer et al. |
| 8,037,097 B2 | 10/2011 | Guo et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullough |
| 8,160,960 B1 | 4/2012 | Fei et al. |
| 8,175,889 B1 | 5/2012 | Girulat et al. |
| 8,195,549 B2 | 6/2012 | Kasower |
| 8,201,257 B1 | 6/2012 | Andres et al. |
| 8,204,812 B2 | 6/2012 | Stewart et al. |
| 8,224,723 B2 | 7/2012 | Bosch et al. |
| 8,234,498 B2 | 7/2012 | Britti et al. |
| 8,239,677 B2 | 8/2012 | Colson |
| 8,244,848 B2 | 8/2012 | Narayanan et al. |
| 8,249,968 B1 | 8/2012 | Oldham et al. |
| 8,271,393 B2 | 9/2012 | Twining et al. |
| 8,281,372 B1 | 10/2012 | Vidal |
| 8,285,613 B1 | 10/2012 | Coulter |
| 8,285,656 B1 | 10/2012 | Chang et al. |
| 8,290,840 B2 | 10/2012 | Kasower |
| 8,290,856 B1 | 10/2012 | Kasower |
| 8,291,218 B2 | 10/2012 | Garcia et al. |
| 8,291,477 B2 | 10/2012 | Lunt |
| 8,296,229 B1 | 10/2012 | Yellin et al. |
| 8,302,164 B2 | 10/2012 | Lunt |
| 8,312,033 B1 | 11/2012 | McMillan |
| 8,321,339 B2 | 11/2012 | Imrey et al. |
| 8,327,429 B2 | 12/2012 | Speyer et al. |
| 8,355,967 B2 | 1/2013 | Debie et al. |
| 8,374,973 B2 | 2/2013 | Herbrich et al. |
| 8,412,593 B1 | 4/2013 | Song et al. |
| 8,433,654 B2 | 4/2013 | Subbarao et al. |
| 8,442,886 B1 | 5/2013 | Haggerty et al. |
| 8,447,016 B1 | 5/2013 | Kugler et al. |
| 8,456,293 B1 | 6/2013 | Trundle et al. |
| 8,464,939 B1 | 6/2013 | Taylor et al. |
| 8,473,318 B2 | 6/2013 | Nielson et al. |
| 8,478,674 B1 | 7/2013 | Kapczynski et al. |
| 8,484,186 B1 | 7/2013 | Kapczynski et al. |
| 8,515,828 B1 | 8/2013 | Wolf et al. |
| 8,515,844 B2 | 8/2013 | Kasower |
| 8,527,357 B1 | 9/2013 | Ganesan |
| 8,527,417 B2 | 9/2013 | Telle et al. |
| 8,527,773 B1 | 9/2013 | Metzger |
| 8,533,118 B2 | 9/2013 | Weller et al. |
| 8,560,436 B2 | 10/2013 | Ingram et al. |
| 8,560,447 B1 | 10/2013 | Hinghole et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,600,886 B2 | 12/2013 | Ramavarjula et al. |
| 8,601,602 B1 | 12/2013 | Zheng |
| 8,606,234 B2 | 12/2013 | Pei et al. |
| 8,606,694 B2 | 12/2013 | Campbell et al. |
| 8,630,938 B2 | 1/2014 | Cheng et al. |
| 8,646,051 B2 | 2/2014 | Paden et al. |
| 8,705,718 B2 | 4/2014 | Baniak et al. |
| 8,706,599 B1 * | 4/2014 | Koenig ............... G06Q 40/06 705/35 |
| 8,725,613 B1 | 5/2014 | Celka et al. |
| 8,738,516 B1 | 5/2014 | Dean et al. |
| 8,744,956 B1 | 6/2014 | DiChiara et al. |
| 8,768,914 B2 | 7/2014 | Scriffignano et al. |
| 8,781,953 B2 | 7/2014 | Kasower |
| 8,782,217 B1 | 7/2014 | Arone et al. |
| 8,782,753 B2 | 7/2014 | Lunt |
| 8,793,777 B2 | 7/2014 | Colson |
| 8,800,005 B2 | 8/2014 | Lunt |

(56) References Cited

U.S. PATENT DOCUMENTS

| | | |
|---|---|---|
| 8,806,584 B2 | 8/2014 | Lunt |
| 8,818,888 B1 | 8/2014 | Kapczynski et al. |
| 8,856,894 B1 | 10/2014 | Dean et al. |
| 8,930,251 B2 | 1/2015 | DeBie |
| 8,930,263 B1 | 1/2015 | Mahacek et al. |
| 8,931,058 B2 | 1/2015 | DiChiara et al. |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,058,627 B1 | 6/2015 | Wasser et al. |
| 9,100,400 B2 | 8/2015 | Lunt |
| 9,106,691 B1 | 8/2015 | Burger et al. |
| 9,147,042 B1 | 9/2015 | Haller et al. |
| 9,230,283 B1 | 1/2016 | Taylor et al. |
| 9,256,904 B1 | 2/2016 | Haller et al. |
| 2001/0001877 A1 | 5/2001 | French et al. |
| 2001/0011245 A1 | 8/2001 | Duhon |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0037204 A1 | 11/2001 | Horn et al. |
| 2001/0037289 A1 | 11/2001 | Mayr et al. |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0047332 A1 | 11/2001 | Gonen-Friedman et al. |
| 2001/0049274 A1 | 12/2001 | Degraeve |
| 2002/0004736 A1 | 1/2002 | Roundtree et al. |
| 2002/0010616 A1 | 1/2002 | Itzhaki |
| 2002/0013827 A1 | 1/2002 | Edstrom et al. |
| 2002/0013899 A1 | 1/2002 | Faul |
| 2002/0026394 A1 | 2/2002 | Savage et al. |
| 2002/0026519 A1 | 2/2002 | Itabashi et al. |
| 2002/0029192 A1 | 3/2002 | Nakagawa et al. |
| 2002/0032635 A1 | 3/2002 | Harris et al. |
| 2002/0033846 A1 | 3/2002 | Balasubramanian et al. |
| 2002/0035480 A1 | 3/2002 | Gordon et al. |
| 2002/0035684 A1 | 3/2002 | Vogel et al. |
| 2002/0045154 A1 | 4/2002 | Wood et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0069122 A1 | 6/2002 | Yun et al. |
| 2002/0069182 A1 | 6/2002 | Dwyer |
| 2002/0077964 A1 | 6/2002 | Brody et al. |
| 2002/0087460 A1 | 7/2002 | Hornung |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0120757 A1 | 8/2002 | Sutherland et al. |
| 2002/0120846 A1* | 8/2002 | Stewart ............... G06Q 20/04 713/168 |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0157029 A1 | 10/2002 | French et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0194120 A1 | 12/2002 | Russell et al. |
| 2002/0198800 A1 | 12/2002 | Shamrakov |
| 2002/0198806 A1 | 12/2002 | Blagg et al. |
| 2002/0198824 A1 | 12/2002 | Cook |
| 2002/0198830 A1 | 12/2002 | Randell et al. |
| 2003/0002671 A1 | 1/2003 | Inchalik et al. |
| 2003/0007283 A1 | 1/2003 | Ostwald et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0105646 A1 | 6/2003 | Siepser |
| 2003/0105710 A1* | 6/2003 | Barbara ............... G06Q 20/04 705/39 |
| 2003/0105733 A1 | 6/2003 | Boreham |
| 2003/0105742 A1 | 6/2003 | Boreham et al. |
| 2003/0115133 A1 | 6/2003 | Bian |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0177028 A1 | 9/2003 | Cooper et al. |
| 2003/0182214 A1 | 9/2003 | Taylor |
| 2003/0187768 A1 | 10/2003 | Ryan et al. |
| 2003/0187837 A1 | 10/2003 | Culliss |
| 2003/0195859 A1 | 10/2003 | Lawrence |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0220858 A1 | 11/2003 | Lam et al. |
| 2003/0225742 A1 | 12/2003 | Tenner et al. |
| 2003/0229580 A1 | 12/2003 | Gass et al. |
| 2004/0001565 A1 | 1/2004 | Jones et al. |
| 2004/0006488 A1 | 1/2004 | Fitall et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1* | 1/2004 | Gulbrandsen ......... G06Q 40/08 705/36 R |
| 2004/0019799 A1 | 1/2004 | Vering et al. |
| 2004/0024671 A1* | 2/2004 | Freund ............... G06Q 20/00 705/35 |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0044739 A1 | 3/2004 | Ziegler |
| 2004/0046033 A1 | 3/2004 | Kolodziej et al. |
| 2004/0062213 A1 | 4/2004 | Koss |
| 2004/0064347 A1* | 4/2004 | VanOrman ............ G06Q 10/02 705/5 |
| 2004/0078324 A1 | 4/2004 | Lonnberg et al. |
| 2004/0083159 A1* | 4/2004 | Crosby ............... G06Q 40/04 705/37 |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0123162 A1 | 6/2004 | Antell et al. |

(56) References Cited

U.S. PATENT DOCUMENTS

| | | |
|---|---|---|
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153521 A1 | 8/2004 | Kogo |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230527 A1 | 11/2004 | Hansen et al. |
| 2004/0236688 A1 | 11/2004 | Bozeman |
| 2004/0243508 A1 | 12/2004 | Samson et al. |
| 2004/0243518 A1 | 12/2004 | Clifton et al. |
| 2004/0243588 A1 | 12/2004 | Tanner et al. |
| 2004/0243832 A1 | 12/2004 | Wilf et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0015273 A1 | 1/2005 | Iyer |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0027995 A1 | 2/2005 | Menschik et al. |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0080723 A1 | 4/2005 | Burchetta et al. |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Hada |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0166262 A1 | 7/2005 | Beattie et al. |
| 2005/0171884 A1* | 8/2005 | Arnott ................... G06Q 40/00 705/36 R |
| 2005/0203768 A1 | 9/2005 | Florance et al. |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216582 A1 | 9/2005 | Toomey et al. |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0256809 A1 | 11/2005 | Sadri |
| 2005/0267840 A1 | 12/2005 | Holm-Blagg et al. |
| 2005/0273431 A1 | 12/2005 | Abel et al. |
| 2005/0273442 A1 | 12/2005 | Bennett et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0010487 A1 | 1/2006 | Fierer et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0036870 A1 | 2/2006 | Dasari et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0155573 A1 | 7/2006 | Hartunian |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0200396 A1* | 9/2006 | Satterfield et al. ............. 705/35 |
| 2006/0200583 A1 | 9/2006 | Le Lann et al. |
| 2006/0202012 A1 | 9/2006 | Grano et al. |
| 2006/0204051 A1 | 9/2006 | Holland, IV |
| 2006/0212407 A1 | 9/2006 | Lyon |
| 2006/0218407 A1 | 9/2006 | Toms |
| 2006/0223043 A1 | 10/2006 | Dancy-Edwards et al. |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1* | 11/2006 | Romain et al. ................. 705/35 |
| 2006/0271633 A1 | 11/2006 | Adler |
| 2006/0277089 A1 | 12/2006 | Hubbard et al. |
| 2006/0277102 A1 | 12/2006 | Agliozzo |

(56) References Cited

U.S. PATENT DOCUMENTS

| | | |
|---|---|---|
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0055621 A1 | 3/2007 | Tischler et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0160458 A1 | 7/2007 | Yen |
| 2007/0174186 A1 | 7/2007 | Hokland |
| 2007/0174448 A1 | 7/2007 | Ahuja et al. |
| 2007/0174903 A1 | 7/2007 | Greff |
| 2007/0192121 A1 | 8/2007 | Routson et al. |
| 2007/0198432 A1* | 8/2007 | Pitroda ............... G06Q 20/02 705/64 |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0220003 A1 | 9/2007 | Chern et al. |
| 2007/0226047 A1 | 9/2007 | Ward |
| 2007/0226122 A1* | 9/2007 | Burrell ............... G06Q 20/3821 705/37 |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0262140 A1 | 11/2007 | Long, Sr. |
| 2007/0266439 A1 | 11/2007 | Kraft |
| 2007/0273558 A1 | 11/2007 | Smith |
| 2007/0282743 A1* | 12/2007 | Lovelett ............... G06Q 20/10 705/40 |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299770 A1 | 12/2007 | Delinsky |
| 2008/0004957 A1 | 1/2008 | Hildreth et al. |
| 2008/0010203 A1* | 1/2008 | Grant ............... G06Q 20/102 705/44 |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0027859 A1 | 1/2008 | Nathans et al. |
| 2008/0028446 A1 | 1/2008 | Burgoyne |
| 2008/0033742 A1 | 2/2008 | Bernasconi |
| 2008/0033956 A1 | 2/2008 | Saha et al. |
| 2008/0040176 A1 | 2/2008 | Ehling |
| 2008/0040610 A1* | 2/2008 | Fergusson ............... G06Q 40/02 713/182 |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0086759 A1 | 4/2008 | Colson |
| 2008/0091519 A1 | 4/2008 | Foss |
| 2008/0091530 A1* | 4/2008 | Egnatios ............... G06Q 20/10 705/14.25 |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109740 A1 | 5/2008 | Prinsen et al. |
| 2008/0109875 A1 | 5/2008 | Kraft |
| 2008/0110973 A1 | 5/2008 | Nathans et al. |
| 2008/0114670 A1 | 5/2008 | Friesen |
| 2008/0115191 A1 | 5/2008 | Kim et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0133273 A1 | 6/2008 | Marshall |
| 2008/0133278 A1 | 6/2008 | Stanfield |
| 2008/0140476 A1 | 6/2008 | Anand et al. |
| 2008/0140576 A1 | 6/2008 | Lewis et al. |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1* | 7/2008 | Allen-Rouman ...... G06Q 20/02 705/44 |
| 2008/0162383 A1 | 7/2008 | Kraft |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0205655 A1 | 8/2008 | Wilkins et al. |
| 2008/0208548 A1 | 8/2008 | Metzger et al. |
| 2008/0208726 A1 | 8/2008 | Tsantes et al. |
| 2008/0208735 A1 | 8/2008 | Balet et al. |
| 2008/0208873 A1 | 8/2008 | Boehmer |
| 2008/0212845 A1* | 9/2008 | Lund ............... G06F 17/243 382/112 |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |

(56) References Cited

U.S. PATENT DOCUMENTS

| | | |
|---|---|---|
| 2008/0249869 A1 | 10/2008 | Angell et al. |
| 2008/0255992 A1 | 10/2008 | Lin |
| 2008/0263058 A1 | 10/2008 | Peden |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich |
| 2008/0301016 A1 | 12/2008 | Durvasula et al. |
| 2008/0306750 A1 | 12/2008 | Wunder et al. |
| 2008/0319889 A1 | 12/2008 | Hammad |
| 2009/0006230 A1 | 1/2009 | Lyda et al. |
| 2009/0024484 A1 | 1/2009 | Walker et al. |
| 2009/0030776 A1 | 1/2009 | Walker et al. |
| 2009/0031426 A1 | 1/2009 | Dal Lago et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0055322 A1 | 2/2009 | Bykov et al. |
| 2009/0055404 A1 | 2/2009 | Heiden et al. |
| 2009/0055894 A1 | 2/2009 | Lorsch |
| 2009/0064297 A1 | 3/2009 | Selgas et al. |
| 2009/0089190 A1 | 4/2009 | Girulat |
| 2009/0089193 A1 | 4/2009 | Paintin |
| 2009/0089869 A1 | 4/2009 | Varghese |
| 2009/0094237 A1 | 4/2009 | Churi et al. |
| 2009/0094674 A1 | 4/2009 | Schwartz et al. |
| 2009/0094675 A1 | 4/2009 | Powers |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0157564 A1* | 6/2009 | Cross ................. G06Q 40/00 705/36 R |
| 2009/0157693 A1 | 6/2009 | Palahnuk |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0171723 A1 | 7/2009 | Jenkins |
| 2009/0172788 A1 | 7/2009 | Vedula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198602 A1 | 8/2009 | Wang et al. |
| 2009/0199264 A1 | 8/2009 | Lang |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2009/0328173 A1 | 12/2009 | Jakobson et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0030578 A1 | 2/2010 | Siddique et al. |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042542 A1* | 2/2010 | Rose ................. G06Q 20/108 705/42 |
| 2010/0043055 A1 | 2/2010 | Baumgart |
| 2010/0049803 A1 | 2/2010 | Ogilvie et al. |
| 2010/0063942 A1* | 3/2010 | Arnott ................. G06Q 30/02 705/36 T |
| 2010/0063993 A1 | 3/2010 | Higgins et al. |
| 2010/0077483 A1 | 3/2010 | Stolfo et al. |
| 2010/0082476 A1 | 4/2010 | Bowman |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0114776 A1 | 5/2010 | Weller et al. |
| 2010/0121767 A1 | 5/2010 | Coulter et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0145840 A1 | 6/2010 | Kasower |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0223160 A1 | 9/2010 | Brown |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |

(56) References Cited

U.S. PATENT DOCUMENTS

| | | |
|---|---|---|
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1* | 10/2010 | Beemer .................. G06K 5/02 235/380 |
| 2010/0262932 A1 | 10/2010 | Pan |
| 2010/0268557 A1 | 10/2010 | Faith et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0299262 A1 | 11/2010 | Handler |
| 2010/0323446 A1 | 12/2010 | Barnett et al. |
| 2010/0325048 A1 | 12/2010 | Carlson et al. |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0016533 A1 | 1/2011 | Zeigler et al. |
| 2011/0023115 A1 | 1/2011 | Wright |
| 2011/0029388 A1 | 2/2011 | Kendall et al. |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0040736 A1 | 2/2011 | Kalaboukis |
| 2011/0066495 A1 | 3/2011 | Ayloo et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0113084 A1 | 5/2011 | Ramnani |
| 2011/0113086 A1 | 5/2011 | Long et al. |
| 2011/0113096 A1 | 5/2011 | Long et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0196791 A1 | 8/2011 | Dominguez |
| 2011/0211445 A1 | 9/2011 | Chen |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1* | 11/2011 | Kelly .................... G06Q 20/04 705/44 |
| 2011/0276396 A1 | 11/2011 | Rathod |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2012/0005070 A1 | 1/2012 | McFall et al. |
| 2012/0011158 A1 | 1/2012 | Avner et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066106 A1 | 3/2012 | Papadimitriou |
| 2012/0072382 A1 | 3/2012 | Pearson et al. |
| 2012/0078932 A1 | 3/2012 | Skurtovich, Jr. et al. |
| 2012/0084866 A1 | 4/2012 | Stolfo |
| 2012/0089438 A1* | 4/2012 | Tavares ................ G06Q 20/202 705/7.29 |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0151045 A1 | 6/2012 | Anakata et al. |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0198556 A1 | 8/2012 | Patel et al. |
| 2012/0215682 A1 | 8/2012 | Lent et al. |
| 2012/0215719 A1* | 8/2012 | Verlander ............... G06Q 40/06 705/36 R |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack et al. |
| 2012/0253852 A1 | 10/2012 | Pourfallah et al. |
| 2012/0278767 A1 | 11/2012 | Stibel et al. |
| 2012/0290660 A1 | 11/2012 | Rao et al. |
| 2012/0297484 A1 | 11/2012 | Srivastava |
| 2012/0317014 A1 | 12/2012 | Cerise et al. |
| 2012/0324388 A1 | 12/2012 | Rao et al. |
| 2013/0006843 A1* | 1/2013 | Tralvex .................. G06Q 40/04 705/37 |
| 2013/0018811 A1 | 1/2013 | Britti et al. |
| 2013/0031109 A1 | 1/2013 | Routson et al. |
| 2013/0031624 A1 | 1/2013 | Britti et al. |
| 2013/0066775 A1 | 3/2013 | Milam |
| 2013/0080467 A1 | 3/2013 | Carson et al. |
| 2013/0085804 A1 | 4/2013 | Leff et al. |
| 2013/0103571 A1 | 4/2013 | Chung et al. |
| 2013/0110557 A1 | 5/2013 | Kasower |
| 2013/0110565 A1 | 5/2013 | Means et al. |
| 2013/0110678 A1 | 5/2013 | Vigier et al. |
| 2013/0117072 A1 | 5/2013 | Nish |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0246528 A1 | 9/2013 | Ogura |
| 2013/0267171 A1 | 10/2013 | Sarkar et al. |
| 2013/0279676 A1 | 10/2013 | Baniak et al. |
| 2013/0293363 A1 | 11/2013 | Plymouth |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1 | 1/2014 | Daley |
| 2014/0032300 A1 | 1/2014 | Zhang et al. |
| 2014/0032723 A1 | 1/2014 | Nema |
| 2014/0046872 A1* | 2/2014 | Arnott .................... G06Q 40/06 705/36 R |
| 2014/0061302 A1 | 3/2014 | Hammad |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |

(56) References Cited

U.S. PATENT DOCUMENTS

| | | |
|---|---|---|
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0280945 A1 | 9/2014 | Lunt |
| 2014/0289812 A1 | 9/2014 | Wang et al. |
| 2014/0298485 A1 | 10/2014 | Gardner |
| 2014/0317023 A1* | 10/2014 | Kim ............ G06Q 40/04 705/36 R |
| 2014/0379554 A1 | 12/2014 | Grossman et al. |
| 2015/0178829 A1 | 6/2015 | Weiss |
| 2015/0249655 A1 | 9/2015 | Lunt |
| 2015/0310543 A1 | 10/2015 | Debie |
| 2015/0324920 A1 | 11/2015 | Wilson et al. |
| 2015/0326580 A1 | 11/2015 | McMillan et al. |

FOREIGN PATENT DOCUMENTS

| | | |
|---|---|---|
| EP | 1 239 378 | 1/2002 |
| EP | 1 301 887 | 4/2003 |
| EP | 1 850 278 | 10/2007 |
| EP | 2 088 743 | 8/2009 |
| EP | 2 074 513 | 2/2016 |
| GB | 2 102 606 | 2/1983 |
| JP | 2005-208945 | 8/2005 |
| KR | 2000-0063313 | 11/2000 |
| KR | 2002-0039203 | 5/2002 |
| KR | 10-2007-0081504 | 8/2007 |
| WO | WO 91/16691 | 10/1991 |
| WO | WO 99/60481 | 11/1999 |
| WO | WO 00/30045 | 5/2000 |
| WO | WO 00/55778 | 9/2000 |
| WO | WO 01/09752 | 2/2001 |
| WO | WO 01/09792 | 2/2001 |
| WO | WO 01/84281 | 11/2001 |
| WO | WO 02/29636 | 4/2002 |
| WO | WO 2004/031986 | 4/2004 |
| WO | WO 2005/010683 | 2/2005 |
| WO | WO 2005/033979 | 4/2005 |
| WO | WO 2006/019752 | 2/2006 |
| WO | WO 2006/050278 | 5/2006 |
| WO | WO 2006/069199 | 6/2006 |
| WO | WO 2006/099081 | 9/2006 |
| WO | WO 2008/042614 | 4/2008 |
| WO | WO 2009/064694 | 5/2009 |
| WO | WO 2009/102391 | 8/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

Ettorre, Paul Kahn on Exceptional Marketing, Management Review, vol. 38(11), Nov. 1994, pp. 48-51.

Gibbs, Adrienne; "Protecting Your Children from Identity Theft," Nov. 25, 2008, http://www.creditcards.com/credit-card-news/identity-ID-theft-and-kids-children-1282.php, pp. 4.

ID Analytics, "ID Analyticse® Consumer Notification Service", Printed Apr. 16, 2013 in 2 pages.

ID Theft Assist, "Do You Know Where Your Child's Credit Is?", Nov. 26, 2007, http://www.idtheftassist.com/pages/story14, pp. 3.

Ideon, Credit-Card Registry that Bellyflopped this Year, Is Drawing some Bottom-Fishers, The Wall Street Journal, Aug. 21, 1995, pp. C2.

Lee, W.A.; "Experian, on Deal Hunt, Nets Identity Theft Insurer", American Banker: The Financial Services Daily, Jun. 4, 2003, New York, NY, 1 page Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?", http://www.lifelock.com/lifelock-for-people/how-we-do-it/how-can-lifelock-protect-my-kids-and-family printed Mar. 14, 2008 in 1 page.

Magid, Lawrence, J., Business Tools: When Selecting an ASP Ensure Data Mobility, Los Angeles Times, Los Angeles, CA, Feb. 26, 2001, vol. C, Issue 4, pp. 3.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

Privacy Rights Clearinghouse, "Identity Theft: What to do if it Happens to You," http://web.archive.org/web/19990218180542/http://privacyrights.org/fs/fs17a.htm printed Feb. 18, 1999.

Ramaswamy, Vinita M., Identity-Theft Toolkit, The CPA Journal, Oct. 1, 2006, vol. 76, Issue 10, pp. 66-70.

Rawe, Julie; "Identity Thieves", Time Bonus Section, Inside Business, Feb. 2002, pp. 2.

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.

Vamosi, Robert, "How to Handle ID Fraud's Youngest Victims," Nov. 21, 2008, http://news.cnet.com/8301-10789_3-10105303-57.html.

Waggoner, Darren J., "Having a Global Identity Crisis," Collections & Credit Risk, Aug. 2001, Vol. vol. 6, No. 8, pp. 6.

Application as filed in U.S. Appl. No. 09/411,683, dated Oct. 4, 1999.

"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.

Elangovan, A.R., "Managerial Third-Party Dispute Intervention: A Prescriptive Model of Strategy Selection", Academy of Management, Oct. 1, 1995, vol. 20, No. 4, pp. 800-830.

"Equifax: Debt Wise™ Credit Monitoring Service," Product Review, http://www.mdmproofinq.com/iym/reviews/equifax/debt-wise/, Jan. 2010, pp. 11.

Equifax; "Places", http://web.archive.org/web/20111111113930/http://www.equifax.com/places as archived Nov. 11, 2011 in 1 page.

Equifax; "Places", http://www.equifax.com/places/ as printed Nov. 16, 2015 in 1 page.

Equifax; "Welcome to Equifax Mobile", http://www.equifax.com/mobile/ as printed Mar. 18, 2011 in 2 pages.

Fenner, Peter, "Mobile Address Management and Billing for Personal Communications", 1st International Conference on Universal Personal Communications, 1992, ICUPC '92 Proceedings, pp. 253-257.

Harrington et al., "iOS 4 in Action", Chapter 17, Local and Push Notification Services, Manning Publications Co., Jun. 2011, pp. 347-353.

Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.

Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.

(56) References Cited

OTHER PUBLICATIONS

LifeLock, http://web.archive.org/web/20110724011010/http://www.lifelock.com/? as archived Jul. 24, 2011 in 1 page.
PrivacyGuard, http://web.archive.org/web/20110728114049/http://www.privacyguard.com/ as archived Jul. 28, 2011 in 1 page.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
U.S. Appl. No. 12/705,489, filed Feb. 12, 2010, Bargoli et al.
U.S. Appl. No. 17/708,511, filed Feb. 12, 2010, Bargoli et al.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aharony et al., "Social Area Networks: Data Networking of the People, by the People, for the People," 2009 International Conference on Computational Science and Engineering, May 2009, pp. 1148-1155.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=1964981RQT=309&Vname=PQD.
ABC News Now:Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/Inform Global, Sep. 2006, pp. 6.
Awoonor-Williams, Princess Josephine, Ph.D. "Gender and Credit: An Analysis of Women's Experience in the Credit Market", ProQuest Dissertations and Theses, 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, http://www.dnb.com/ecomp/help/linkage.htm as printed Dec. 17, 2009 in 1 page.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Elliehausen et al., The Impact of Credit Counseling on Subsequent Borrower Behavior, The Journal of Consumer Affairs, Summer 2007, vol. 41, No. 1, pp. 1-28.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.html, dated Jun. 27, 2007 on www.archive.org.
Experian Consumer Credit Report http://www.experian.com/, as retrieved on Sep. 17, 2008.
Facebook, "Facebook helps you connect and share with the people in your life," www.facebook.com. printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family I FamilySecure.com" http://www.familysecure.com/, as retrieved on Nov. 5, 2009.
"Fictitious Business Name Records", Westlaw Database Directory, http://directoy.westlaw.com/scope/default.asp?db=FBN-ALL&RS-W&VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fund Manager," Portfolio Management software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.

(56) References Cited

OTHER PUBLICATIONS

"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=8528697318&sid=1&Fmt=3&clientId=19649&RQT=309&Vname=PQD.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-seach.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
"Judging Credit: Consumers Need Better Finance Tools", News Journal, Daytona Beach, FL, Dec. 28, 2002.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
LifeLock, Various pages, www.lifelock.com/, 2007.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lund, Graham, "Credit Bureau Data: Maximizing the Benefits," Credit Management, May 2004, ProQuest Central, pp. 44-45.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/1280793.09/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W&VR=2.0 as printed Dec. 17, 2009.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/accessed on Oct. 13, 2011.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printer Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html. printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Planwise, http://planwise.com printed Feb. 8, 2013 in 5 pages.
Planet Receipt—Home, http://www.planetreceipt.com/home printed Oct. 16, 2012 in 2 pages.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.

(56) References Cited

OTHER PUBLICATIONS

"Quicken Support", http://web.archive.org/web/20071231040130/http://web.intuit.com/support/quicken/docs/d_qif.html as archived Dec. 31, 2007 in 6 pages.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.qif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Stauffer et al., "Using HTML 3.2," Second Edition, 1996, Que Publishing, pp. 192-193.
"TransUnion—Child Identity Theft Inquiry". TransUnion. https://www.transunion.com/corporate/personal/fraudIdentityTheft/fraudPrevention/childIDInquiry.paqe, accessed on Nov. 5, 2009.
TransUnion Consumer Credit Report http://www.transunion.com/, as retrieved on Sep. 17, 2008.
US Legal, Description, http://www.uslegalforms.com/us/US-00708-LTR.htm printed Sep. 4, 2007 in 2 pages.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need A Budget, http://www.youneedabudget.com/features printed Feb. 5, 2014 in 3 pages.

\* cited by examiner

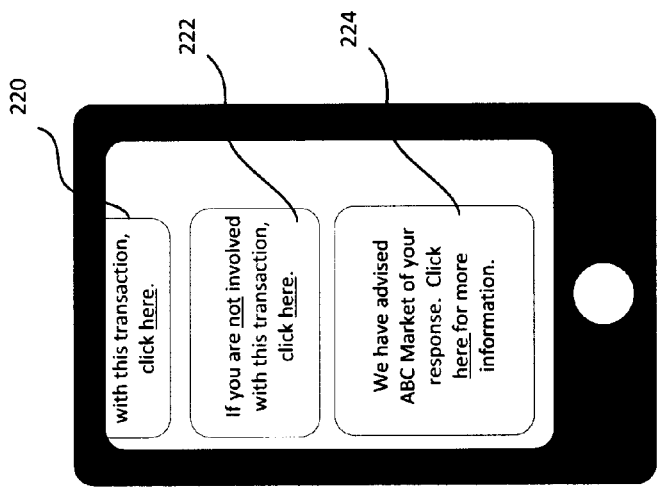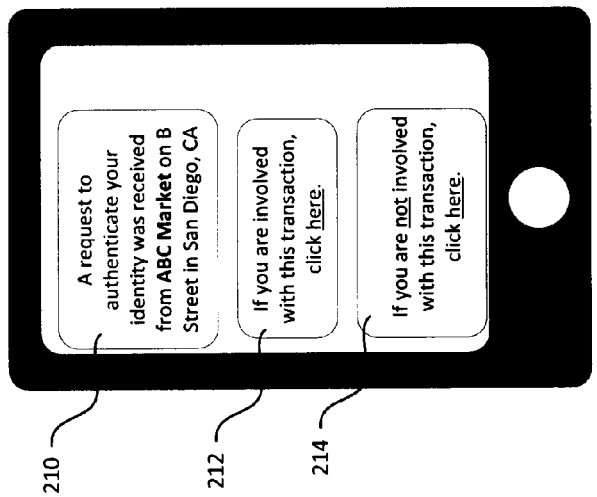
FIGURE 2A

| Identifier | Financial Institution | Vendor(s)/Service Provider(s) | Contact Information |
|---|---|---|---|
| AM-BANK | American Bank | ABL Cable Co. (552034) | Phone – (300) 555-01921<br>Email – accounts@ABL.zzz |
| | | Quality Cellular Phones (431) | Phone – (102) 555-0842 |
| | | .... | .... |
| 45KL0987 | XYZ Capital | Bob's Department Store – West L.A. (12611)<br>123 Main Dr.<br>Los Angeles, CA | Store security – (310) 555-9325<br>XYZ Fraud Dept. – (800) 555-1111 |
| | | Bob's Department Store – San Diego (3974)<br>190 Pine Rd.<br>San Diego, CA | Store security – (312) 555-6671<br>XYZ Fraud Dept. – (800) 555-1111 |
| | | Harry's Department Store (1392) | .... |
| | | .... | |
| NATIONAL | National Financial | Barry's Car Loans (00876) | Phone – (280) 555-01231 |
| | | Higher Ed Student Loans (18361) | Email approvals@edloans.zzz |
| | | .... | .... |
| ..... | | | |

AUTHENTICATION ALERTS

CROSS REFERENCE TO RELATED APPLICATIONS

This application claims the benefit of U.S. provisional application No. 61/497,826, filed Jun. 16, 2011, U.S. provisional application No. 61/504,955, filed Jul. 6, 2011, and U.S. provisional application No. 61/540,654, filed Sep. 29, 2011, the disclosure of which is each hereby incorporated by reference in its entirety.

BACKGROUND

Field

Among other things, this disclosure describes systems and methods for providing an alert to an individual when an entity requests to authenticate the individual, such as when the entity is opening an account for the individual.

Description of the Related Art

When an individual has been a victim of identity theft, there is often a significant time delay between the unauthorized use of the individual's identity occurring and the individual becoming aware of the unauthorized use. Identity theft can occur, for example, when someone uses an individual's personal identifying information, without the individual's authorization, in order to perpetrate fraud or other offenses, such as obtaining loans, services, credit and/or opening an account of some kind in the individual's name. The individual's personal identifying information may include, for example, name, Social Security number, credit card number, address, telephone number, date of birth, driver's license or passport number.

Consumers are often advised to periodically monitor their credit reports in order to be aware of inquiries that may potentially be unauthorized or associated with identity fraud. However, there may be substantial delay between the time that an identity authentication request was received and the time that information becomes available on a credit report. While some systems automatically monitor credit reports for information that may be associated with fraudulent requests for credit data or account open transactions, such systems are not able to identify such transactions as they are occurring or to stop such transactions before completion.

SUMMARY OF THE INVENTION

The present disclosure generally relates to providing an alert to an individual in association with a request to open an account in the individual's name, as well as providing notification to one or more entities associated with the request of potential fraud. For example, in some embodiments, information identifying an individual may be received from a financial entity in association with the financial entity receiving a request to open an account for the individual from a requesting entity. The requesting entity may be, in some embodiments, a vendor or service provider for which the financial entity maintains accounts, such as credit accounts. An electronic notification may then be sent to the individual, which may include an option for the individual to indicate that the individual does not authorize opening of the account. In response to receiving an indication that the individual does not authorize opening of the account, notifications may be sent to both the financial entity and the requesting entity indicating that the individual has not authorized opening of the account.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some embodiments, an alert module, as described herein, may receive, from a financial entity, information identifying an individual. The information identifying the individual may be received in association with the financial entity receiving a request to open an account for the individual from a requesting entity. The requesting entity may be a vendor or service provider associated with the financial entity. The alert module may then retrieve contact information associated with the individual from one or more data stores. The alert module may send an electronic notification to the individual based at least in part on the retrieved contact information. The alert module may then receive an indication that the individual has indicated that the individual does not authorize opening of the account. In response to receiving the indication, the alert module may provide a first notification to the financial entity and provide a second notification to the requesting entity, where the first notification and the second notification each indicate that the individual has not authorized opening of the account.

BRIEF DESCRIPTION OF THE DRAWINGS

FIGS. 2A and 2B illustrates a computing device, such as a mobile phone, that receives alerts in the form of text messages.

FIG. 6 is an illustrative representation of a table associating financial institutions with vendors and/or service providers, along with corresponding contact information.

Figure 1:
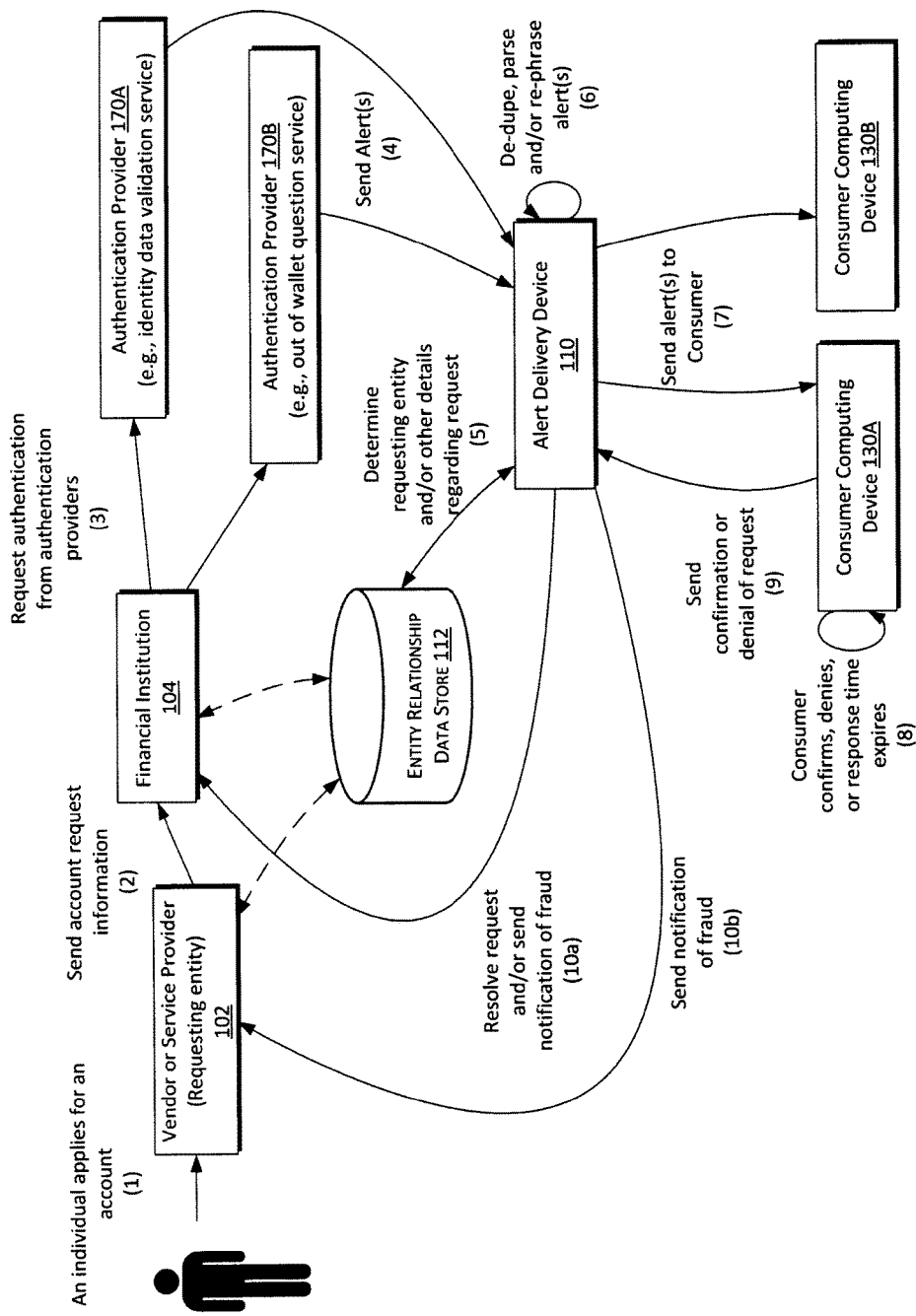
FIG. 1 is a functional block diagram showing a sample high-level flow of events in an alert system, according to certain embodiments.

These and other features will now be described with reference to the drawings summarized above. The drawings and the associated descriptions are provided to illustrate certain embodiments and not to limit the scope of the invention. Throughout the drawings, reference numbers may be re-used to indicate correspondence between referenced elements.

DETAILED DESCRIPTION

Various embodiments of systems, methods, processes, and data structures will now be described with reference to the drawings. Variations to the systems, methods, processes, and data structures that represent other embodiments will also be described.

According to certain embodiments, an alert system, which may include an alert delivery device, may provide an alert to an individual when the individual's identity is used in association with a request to open an account. For example, an alert delivery device, as disclosed herein, may provide an alert to a device associated with the individual when identification information associated with the individual is included in a request associated with a new account opening by a third-party, such as a financial institution. In some embodiments, the financial institution may be, for example, a bank or credit card issuer that maintains credit accounts for individuals on behalf of a separate entity, such as a vendor or service provider. In some embodiments, the alert delivery device may determine both the financial institution and the underlying requesting entity, such as a vendor or service provider, based on information associated with an account opening request. The alert delivery device may provide an alert to the individual that includes an option for the individual to indicate that the request is not authorized. When the alert delivery device receives an indication from the individual that the request was not authorized, the alert delivery device may send notification of the unauthorized request to the financial institution and/or the associated requesting entity. In some embodiments, the notification may be provided to the requesting entity quickly enough that a fraudster purporting to be the individual may be detained or arrested at the location where identity fraud occurred.

In some embodiments, an alert system as described herein may include an enrollment component. For example, the enrollment component may be offered via a monitoring service that enrolls consumers in an identity monitoring service. In some embodiments, an alert provider may have a relationship with a credit bureau, authentication provider, or other service, such that certain requests that are received by the credit bureau or authentication provider are sent to the alert provider prior to being processed by the credit bureau or authentication provider. Furthermore, in some embodiments the alert provider may be an intermediary that receives authentication requests or other requests associated with an account opening directly from requesting entities or financial institutions and transmits the requests to one or more credit bureaus, authentication providers, or other services after (or concurrently with) extraction of information regarding a consumer identified in the request and initiation of alert transmission to the consumer.

In some embodiments, alerts may be generated very quickly (e.g., in real-time or substantially in real-time) after a request associated with an account opening or other triggering event occurs. For example, alerts may be transmitted to an individual within seconds of the triggering event occurring. Similarly, notifications indicating that the individual has indicated that a transaction is not authorized may be transmitted to a requesting entity and/or a financial institution in real-time or substantially in real-time after a response is received from the individual. In other embodiments, notifications or alerts to individuals, requesting entities and/or financial institutions may be transmitted in batches, where the batch processing may occur every N seconds, minutes, hours, or other period.

In some embodiments, identity information that may be included in an authentication request or other request analyzed by an alert delivery device may broadly include various types of data associated with an individual. Examples that may be considered identity information, in some embodiments, include name, address, telephone number, email address, social security number, etc. Although the description provided herein refers to individuals, consumers, or customers, the terms "user," "individual," "consumer," and "customer" may, according to some embodiments, include groups of individuals, such as, for example, married couples or domestic partners, organizations, groups, and business entities.

An authentication request may generally refer to a request to authenticate an individual's identity based at least in part on one or more pieces of identification information. In some embodiments, an authentication request may be a part of an account opening transaction or request. For example, when an entity initiates a process to open a new credit account or other account for an individual, the entity may first attempt to authenticate the individual. The entity may subsequently request credit data associated with the individual as a part of the account opening process. In other embodiments, an entity may open an account for an individual by requesting to authenticate the individual without requesting credit data associated with the individual. In other embodiments, the entity may open an account for the individual by submitting a credit data request without a separate authentication request. As will be appreciated, examples described herein with reference to authentication requests may also be applicable to requests for credit data and/or other types of requests associated with the opening of an account, line of credit, or other transaction. Examples of account types that may be associated with a request to open a new account may include, for example, a mortgage, a revolving loan, a credit card, financial services, utilities, leasing, renting, television service, telephone service, and/or other types of credit or non-credit accounts.

FIG. 1 is a functional block diagram showing a sample high-level flow of events in an alert system, according to certain embodiments. As shown in FIG. 1, an individual applies for an account with a vendor or service provider 102. For purposes of example, the individual applying for the account may be a fraudster asserting the identity of Ms. Jane Smith. The fraudster may be attempting to open a credit account, for example, in the name of Ms. Smith with a vendor 102, such as a department store. As will be appreciated, the vendor or service provider could be any of a number of business types involved in opening accounts for consumers, including credit accounts and/or non-credit accounts. The accounts of the vendor may be maintained by a financial institution 104, such as a bank or credit card company, on behalf of the vendor. Accordingly, as illustrated, the vendor may send account request information to the financial institution, which may include information identifying Ms. Smith, as provided to the vendor by the fraudster purporting to be Ms. Smith. The financial institution may then request authentication of the person presenting herself as Ms. Smith. Depending on the embodiment, one or more authentication providers may be accessed in order to authenticate the individual presenting the identity of Ms. Smith. In the illustrated example, an authentication request is sent to authentication provider 170A, which may be, for example, an identity data validation service that authenticates an individual based on the types of data provided and the extent to which the data matches known information about the individual. In the illustrated example, an authentication request is also sent to authentication provider 170B, which may be an out of wallet question service that asks someone purporting to be a given individual one or more questions regarding data that is not easily accessible to people other than the identified individual. As will be appreciated, authentication requests and/or other requests associated with an account opening may additionally or alternatively be received by entities other than an authentication provider, such as a credit bureau, for example.

Next, in the embodiment illustrated in FIG. 1, one or more authentication providers or other recipients of the authentication request or account open request may provide indication(s) of the request to an alert device 110 for delivering a real-time authentication alert or other alert to the individual identified in the authentication request. The alert delivery device may be associated with an alert system, which may actually be multiple systems operated by multiple entities. In other embodiments, the alert delivery device may be operated by an authentication provider, a credit bureau, or other entity that initially receives the authentication request from the financial institution.

In some embodiments, the alert delivery device 110 may retrieve information from an entity relationship data store 112 in order to determine the requesting entity and/or other details regarding the request. For example, as discussed in more detail below, the entity relationship data store may include data associating a number of financial institutions with one or more venders or service providers for which the financial institution services or maintains accounts. Accordingly, such data may be used by the alert delivery device 112 to determine the underlying vendor or service provider (such as the department store, in the given example) associated with the financial institution's authentication request. The entity relationship data store may include contact information for the financial institution and/or the vendor 102 (e.g., the requesting entity).

The alert delivery device 110 may, in some embodiments, de-dupe, parse, and/or re-phrase the alerts or notifications received from the authentication provider(s) and/or other entities. For example, multiple alerts may be received by the alert delivery device for the same consumer activity, such as when multiple alert providers may transmit alerts to the alert delivery device. The alert delivery device may parse and/or re-phrase the alert to make it user friendly. For example, the alert delivery device may correlate information included in the alert, such as alert type, with a particular alert message. Additionally, different alert messages or formats may be accessed depending on the delivery medium, such as e-mail, software application, SMS, voice, etc.

As illustrated in FIG. 1, an alert or notification indicating that an individual is attempting to open a new credit account or other account in the name of Ms. Smith is sent by the alert delivery device 110 to one or more devices associated with Ms. Smith, such as consumer computing device 130A and consumer computing device 130B. The alert delivery device 110 may determine contact information and/or contact preferences for Ms. Smith based on, for example, information that Ms. Smith provided when enrolling in a monitoring service or alert service. The one or more alerts may be provided in various manners, and may depend in part on the device type. For example, alerts may be delivered, in some embodiments, via one or more of e-mail, text message, phone call, an online portal that is accessible to alert members (e.g., a credit monitoring or identity protection website), printed digests, mobile applications, etc.

In certain embodiments, the alert may include one or more options that Ms. Smith may select in order to indicate whether she authorizes the request (indicating, for example, that she is the individual that has presented her identification information to the vendor or service provider in association with the account opening request), or to indicate that she does not approve or authorize the request (indicating, for example, that she may be the potential victim of identity fraud in association with the account opening or other request). In some embodiments, the alert may include a time and date associated with the request, and/or location information regarding the source of the request.

In the embodiment of FIG. 1, Ms. Smith does not recognize the application for new credit and, thus, would like to prevent the application from being further processed. Accordingly, Ms. Smith may provide an indication back to the alert delivery device 110 (or other device associated with an alert system) that the individual presenting Ms. Smith's identity information is not actually her. The alert system may then implement one or more responsive actions in order to prevent harm to Ms. Smith's identity, stop the account open transaction, and/or initiate detainment or apprehension of the fraudster at the vendor's location. In some embodiments, the alert system may be operated in a closed-loop manner, such that a default action of approval or denial occurs if the consumer does not respond to an alert within a certain time period. For example, the requesting entity may wait a predetermined time (e.g., a customizable time between 15 seconds to 10 minutes) after requesting authentication before proceeding with the account opening transaction. This provides the consumer with time to respond to the request in order to stop the transaction from occurring in the event that the consumer isn't the person associated with the authentication request or account opening. In other embodiments, the authentication request may be processed in parallel with any review of the alert by the consumer, where the authentication request and/or account opening process may be halted if the consumer responds to the alert indicating that the request is not authorized. The determination of the time period to wait after transmitting an authentication alert or whether an affirmative response is required prior to proceeding with a transaction may be determined, for example, by agreement between the requesting entity (e.g., vendors and service providers) and the operator of the alert system. In other embodiments, a vendor may not complete the account opening unless and until an authentication response is received indicating that the identity provided by the person requesting the account opening belongs to that person. Thus, different vendors can have different preferences for proceeding with actions, such as account opening actions, in response to receiving or not receiving authentication responses, possibly within predetermined time periods. Accordingly, a first vendor may complete opening of an account 10 minutes after an authentication request is transmitted and no response is received, while a second vendor may cancel opening an account if a response is not received within 10 minutes of the authentication request being transmitted. Depending on the embodiment, vendors may have different preferences based on the risk level associated with the particular account offered by the vendor.

According to some embodiments, the alert delivery device 110, or other device associated with an alert system, may initiate cancellation of the application process, such that the fraudster cannot complete the application process using Ms. Smith's identity. For example, the alert system, either directly or via authentication providers 170A and 170B, may send an alert or indication to the financial institution 104 resolving the authentication as failed and/or notifying of potential fraud. The alert system may additionally or alternatively send a notification of fraud to the vendor 102, such as using contact information retrieved from the entity relationship data store 112 or included in the alert received from the financial institution or an authentication provider. In some embodiments, the notification to the vendor may be provided to a phone number, e-mail address or device associated with security personnel at the vendor's location, such that the security personnel may attempt to detain the fraudster at the location where the fraudster presented Ms. Smith's identity. Alternatively or additionally, other actions may be performed by the alert system in order to reduce harm to Ms. Smith's identity.

The alerts to consumers may include detailed information regarding the requesting entity. For example, rather than simply indicating the name of a chain store from which an authentication request was received, in some embodiments the alerts may include the particular store location (e.g., city, state, street address, web address, etc.) and possibly even a particular computing device (e.g., IP address, geo-location, etc.) from which the request was originated. Having more detailed information regarding the requesting entity allows the consumer to better determine whether there is potential identity fraud. Additionally, the detailed information may allow the alert system to communicate more directly to those at the requesting entity that are involved in the transaction. For example, a response indicating fraudulent use of a consumer's identity may be transmitted directly to a POS terminal in a large retail chain store in order to decrease the risk of the retail chain store continuing with the transaction requested by the fraudster.

FIG. 2A illustrates a computing device, such as a mobile phone, that receives alerts from the alert system in the form of text messages. In this embodiment, the consumer is provided with the ability to respond to the alert in real-time so that the reply can be communicated to the requesting entity to possibly prevent fraudulent use of the consumer's identity. In the embodiment illustrated, the consumer may respond by selecting links provided in the text messages. In another embodiment, the user may respond by sending a response to the received text message, such as "Stop" if the user would like the transaction to be halted. In other embodiments, alerts may be received and responded to via a stand-alone application that may be authorized to provide real-time push alerts to the user's mobile device.

As illustrated, the user first receives a text message 210 that notifies the user that an authentication request associated with the user's identity was received from ABC Market in San Diego. The user may select option 212 to indicate that the user is indeed involved in the transaction. Alternatively, the user may select option 214 to indicate that the user is not involved in the transaction. In the illustrated example, the user has selected option 214 (also illustrated as option 222) to indicate to the alert delivery device that the user is not involved in the transaction and does not authorize the authentication request. As noted in responsive message 224 sent by the alert delivery device, the alert system has notified the requesting entity (e.g., ABC Market in the illustrated example) that the user has not authorized the request.

Figure 2B:
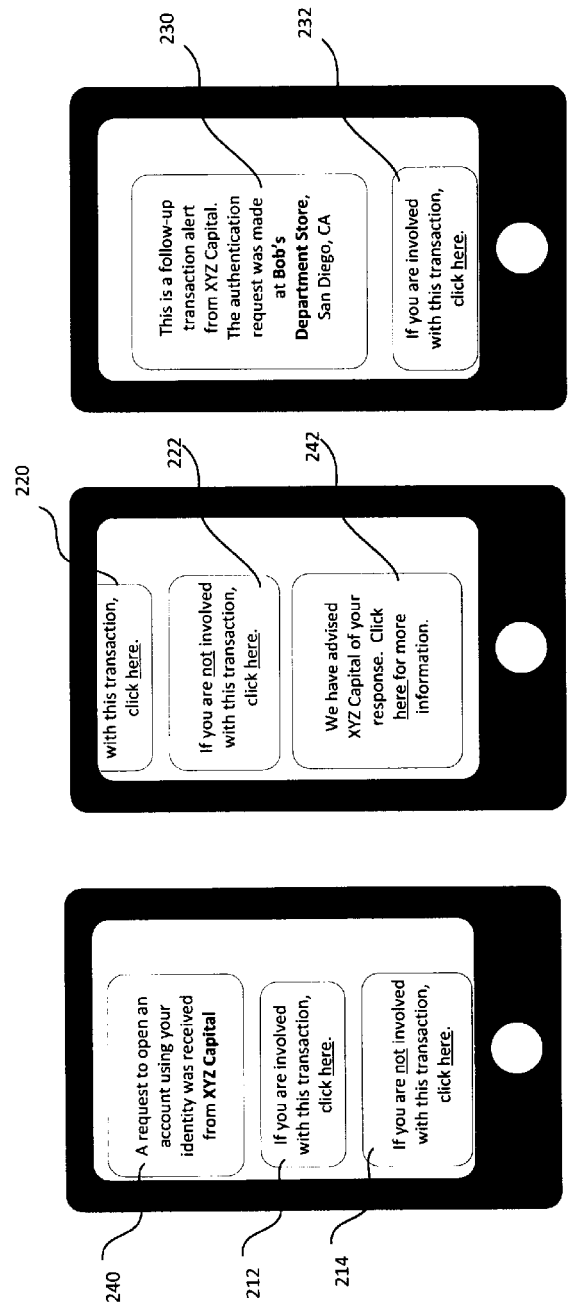
Figure 3:
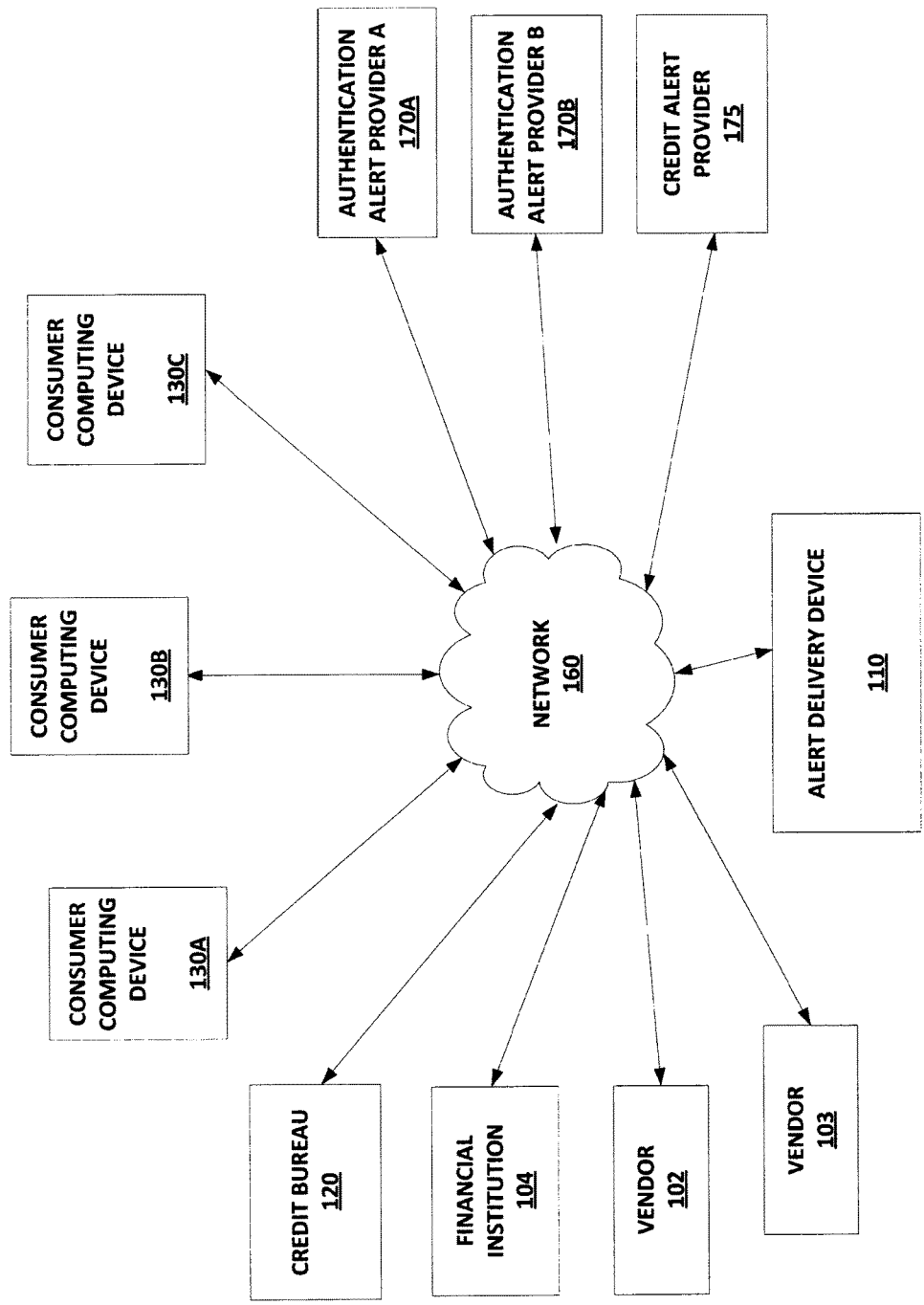
FIG. 3 illustrates an alert delivery device in communication with various systems, including an authentication alert provider and credit alert provider.

FIG. 2B illustrates another example of a computing device, such as a mobile phone, that receives alerts from the alert system in the form of text messages. As illustrated, the alert system initially sends a message 240 that indicates that a request to open an account using the user's identity was received from XYZ Capital. The user may select option 212 to confirm that the user was involved in this account opening request, or option 214 to indicate that the user was not involved in this account opening request. As illustrated by messages 222, the user may indicate that the user was not involved in the transaction, similar to the example discussed above with reference to FIG. 2A. The user may, for example, not recognize the name "XYZ Capital," and therefore select option 214. In response, the alert system may, in some embodiments, determine additional information regarding the underlying requesting entity (such as a vendor or service provider) associated with XYZ Capital. For example, the alert system may receive the additional information from XYZ Capital, or may retrieve the information from a data store, such as entity relationship data store 112. The alert system may then send message 230 to the user, which identifies "Bob's Department Store" in San Diego as the requesting entity associated with the authentication request ultimately submitted by XYZ Capital. XYZ Capital may be, for example, the financial institution that issues department store credit cards for Bob's Department Store. If the user now recognizes the request (such as because the user did not previously know that XYZ Capital issues credit cards for Bob's Department Store) and did in fact authorize this request, the user may select option 232. While FIG. 2B illustrates an embodiment in which the requesting entity is identified in a follow-up alert, in other embodiments, the requesting entity may be identified in the initial alert to the user. In other embodiments, the user may specifically request further information regarding the requesting entity, such as by selecting a link in a text message or bottom in a stand-alone application requesting further information regarding the requesting entity FIG. 3 illustrates an alert delivery device 110 in communication with various systems, according to one embodiment. As illustrated, the various systems are in communication via network 160, which may be one or more of a LAN, WAN, and/or the Internet, for example. As illustrated, the alert delivery device 110 is in communication with consumer computing devices 130A, 130B and 130C. The consumer computing devices may be, for example, devices to which the alert delivery device delivers alerts, such as in connection with the consumers' enrollment in an identity monitoring, credit monitoring, or other monitoring or alert system. The alert delivery device 110 may receive authentication request notifications from authentication alert providers 170A and/or 170B, which may provide the basis for the alert delivery device to generate and deliver an alert to a consumer device. Alternatively or additionally, the alert delivery device may receive notification of a request for credit data for a given consumer from a credit alert provider 175 or a credit bureau 120, which may be a basis for an alert to be delivered to the consumer, in some embodiments. In other embodiments, the alert delivery device may receive authentication requests directly from financial institution 104, vendor 102 or vendor 103 (which may be the requesting entity associated with the authentication request). As discussed above, in response to a consumer indicating that the consumer does not authorize a given request identified in an alert, the alert delivery device may notify the financial institution 104 and the requesting entity, such as vendor 102 or vendor 103. As will be appreciated, the alert delivery device may be in communication with a number of other alert providers, vendors, service providers, and consumer devices not illustrated in FIG. 3.

Figure 4:
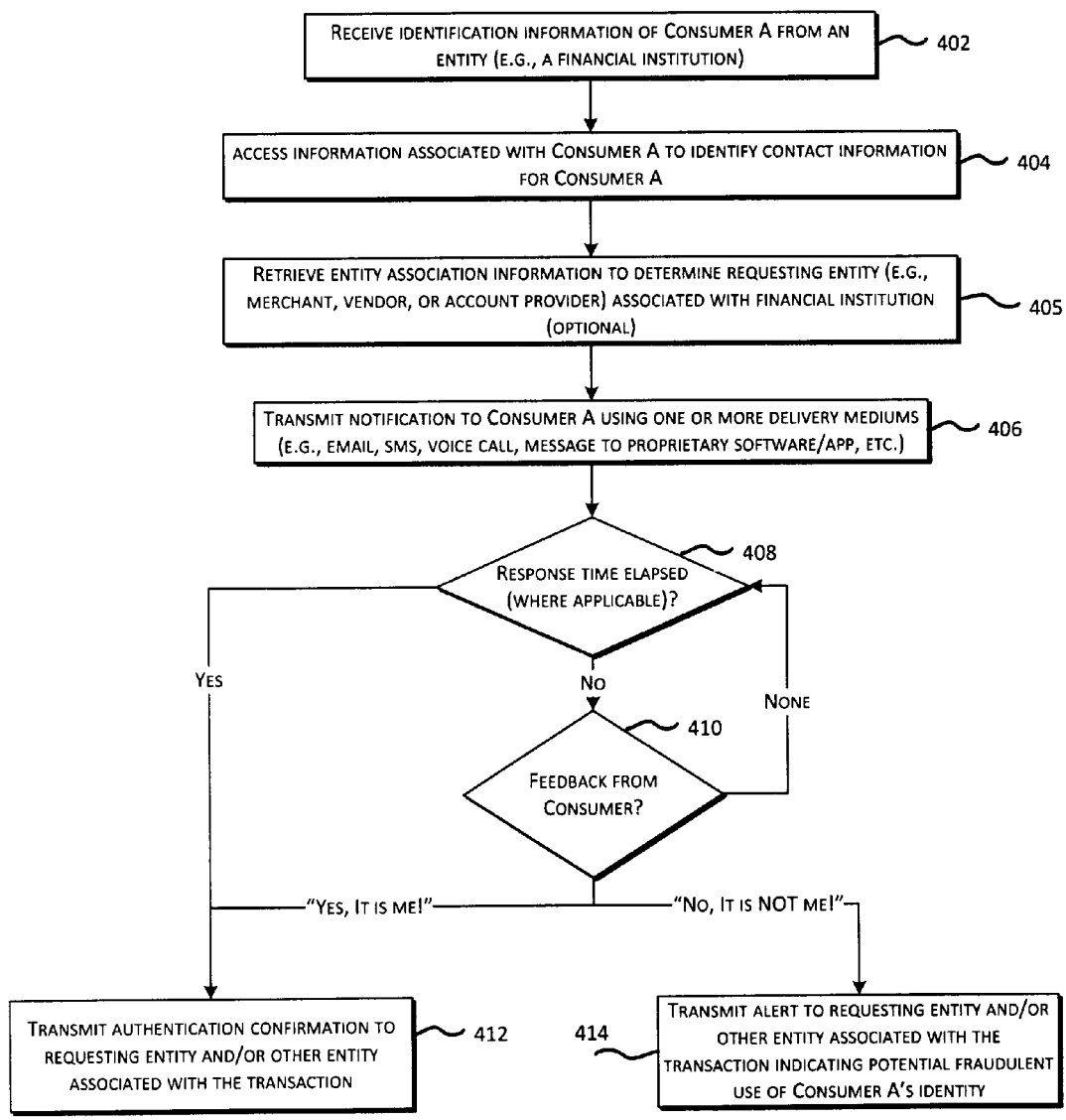
FIG. 4 is a flowchart illustrating one embodiment of a method for providing an authentication alert to an individual.

FIG. 4 is a flowchart illustrating one embodiment of a method for providing an authentication alert to an individual. The illustrative method may be implemented by an alert delivery device, such as alert delivery device 110, which may be associated with an alert system that includes one or more computing devices. In some embodiments, the alert delivery device may include an alert module (discussed below with reference to FIG. 7) that implements the method illustrated in FIG. 4. The illustrative method begins at block 402, where the alert module receives identification information associated with a particular consumer from an entity, such as a financial institution. As discussed above, the financial institution may be submitting an authentication request identifying the consumer based on a request submitted to the financial institution by a vendor or service provider associated with the financial institution. The request may be associated, for example, with a transaction to open an account on behalf of the vendor or service provider. As used in the illustrated example, the underlying vendor or service provider that submitted the initial request to the financial institution will be referred to as the requesting entity. In other embodiments, the alert module may receive notification of the authentication request from an entity other than the financial entity, such as an authentication alert provider, credit bureau or other entity.

Once the alert module receives the consumer's identification information associated with the authentication request, the method proceeds to block 404, where the alert module accesses information associated with the identified consumer to identify contact information for the consumer. For example, the alert module may retrieve contact information from one or more data stores based on a determined match between the consumer identification information included in the authentication request and contact information associated with a number of different consumers. The consumer information may be stored, for example, based on the consumers' enrollment in a monitoring service, and/or based on personal data stored in association with another credit or non-credit related service. In some embodiment, the alert module may determine a confidence score based on the amount and/or type of information matched, such that the alert module only determines a given consumer to be a match for the authentication request data if the confidence score exceeds a certain threshold. The contact information retrieved may include, for example, one or more of an e-mail address, phone number, address, IP address, a user account name associated with enrollment in a monitoring service, etc.

At block 405, the alert module may, in some embodiments, retrieve entity association information to determine the requesting entity (such as a particular merchant, vendor or account provider) associated with the financial institution. For example, as discussed above, the alert module may retrieve data from one or more data stores that associates each of a number of different financial entities with one or more requesting entities with which the given financial entity is associated. Such association data is described with more detail below with reference to FIG. 6. In this manner, the alert module may provide the consumer with the specific underlying requesting entity (which may include a specific merchant or store location) in order for the consumer to better determine if the authentication request was authorized or fraudulent.

At block 406, the alert module transmits a notification or alert to the consumer using one or more delivery mediums according to the contact information retrieved at block 404. For example, the alert may be delivered via e-mail, within a software application, an online portal or website, SMS text message, voice call, etc. In some embodiments, the delivery method may be selected based on preferences previously provided by the consumer. In embodiments in which the alert module operates in a closed-loop manner, the alert module may determine at block 408 whether a response time limit has elapsed since sending the alert to the consumer. The response time limit may be, for example, a certain number of seconds or minutes that the consumer has to respond before the alert module will take a default action of confirming or denying the authentication request. In the illustrated embodiments, the default action is to proceed to block 412 associated with confirming the authentiction request. In other embodiments, the default action upon time expiring may be to not authenticate the consumer. In some embodiments, the alert module may not have a time limit, such that the alert module will take no action until or unless the consumer responds. In other embodiments, the alert module may send an indication that the consumer has not responded within the time limit, leaving the decision to the financial institution and/or requesting entity regarding how to proceed.

In the illustrated embodiment, if the alert module receives feedback from the consumer at block 410 indicating that the person submitting the consumer's information to the requesting entity is not in fact the consumer, the method proceeds to block 414 where the alert module may transmit an alert to the requesting entity, financial entity, and/or other entity associated with the request indicating that the request should be denied and/or that the consumer's identity may have been fraudulently used. If the consumer instead indicates that the consumer authorized the request, the method proceeds to block 412, where the alert module transmits a confirmation to the requesting entity and/or the financial institution that the account opening process may continue and/or that the authentication request is approved. In other embodiments, the alert module may only send notifications to the requesting entity in the case of potential fraud. As discussed above, the notification to the requesting entity may be provided in real-time or near-real time, such that the account open transaction can be stopped before it is completed and a fraudster purporting to be the consumer may potentially be stopped and detained by security or police.

Figure 5:
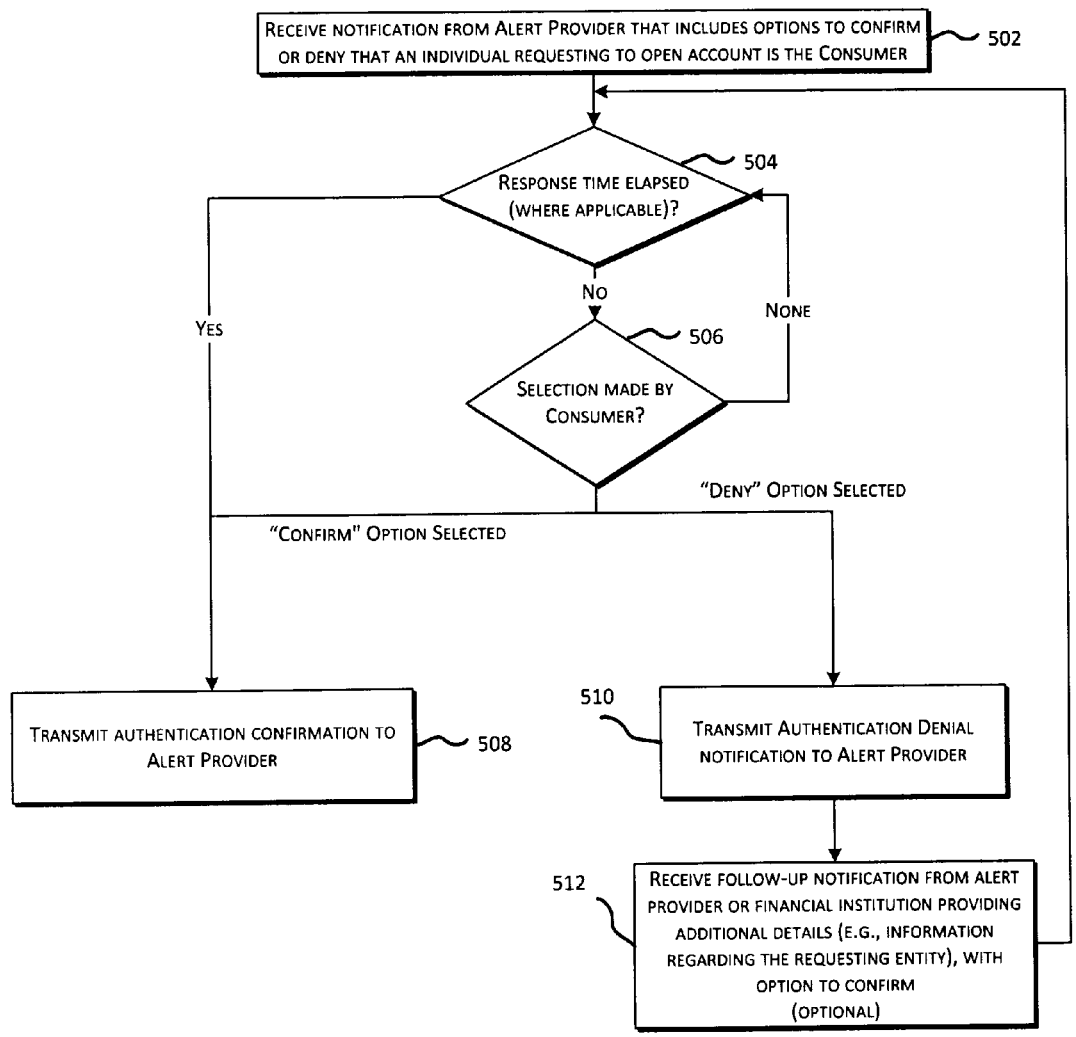
FIG. 5 is a flowchart illustrating one embodiment of a method for receiving and responding to an authentication alert on a consumer's device.

FIG. 5 is a flowchart illustrating one embodiment of a method for receiving and responding to an authentication alert on a consumer's device. Aspects of FIG. 5 have been described above with reference to the illustrative text messages of FIG. 2B. The illustrative method begins at block 502, where the consumer device receives notification from an alert provider (which may be delivered via an alert module, as described above) that includes options to confirm or deny that an individual requesting to open an account with a requesting entity is in fact the consumer. At block 504, the consumer's device determines whether a response time limit has elapsed. If the time has elapsed, the consumer's device may send an authentication confirmation to the alert provider at block 508. In other embodiments, the determination of whether time has elapsed may be made by the alert provider without a response being sent by the consumer's device. In other embodiments, there might not be a time limit in place.

If the consumer selects a "confirm" option in association with the alert at block 506, the illustrative method proceeds to block 508, where the consumer's device transmits an authentication confirmation to the alert provider. If the consumer selects a "deny" option at block 508, the illustrative method proceeds to block 510, where the consumer's device transmits an authentication denial notification to the alert provider. In some embodiments, the method may then proceed to block 512, in which the consumer's device may receive a follow-up notification from the alert provider or financial institution providing additional details (such as the name of the requesting entity), with an option to confirm, such as message 230 described above with reference to FIG. 2B.

FIG. 6 is an illustrative representation of a table 600 associating financial institutions with vendors and/or service providers, along with corresponding contact information for at least a subset of the financial institutions, vendors and service providers. The data represented in illustrative table 600 may be stored in one or more data stores accessible to the alert delivery device 110, such as entity relationship data store 112. The data may be determined and stored, for example, based on information provided by each financial institution to the alert system, either in bulk prior to sending individual authentication requests or in a piecemeal fashion as authentication requests or other requests are processed by the alert system. In some embodiments, when the alert system receives indications of authentication requests, the alert system may consult the data in table 600 to automatically determine the requesting entity associated with the request by matching data included in the request with data previously stored in table 600. In this manner, the alert system may quickly provide an alert to the consumer that includes additional information (such as the identity of the requesting entity) that was not necessarily included in the authentication request itself, and may quickly contact the requesting entity directly in the event of fraudulent use of the consumer's identity.

As illustrated in table 600, row 602 includes a financial entity identifier ("AM-BANK") associated with the financial institution "American Bank." In some embodiments, the identifier may be included in authentication requests from American Bank without any other indication of the identity of the financial institution, such that table 600 enables the alert system to determine the full, consumer-recognizable entity name corresponding to the "AM-BANK" identifier. Row 602 additionally includes two different vendors or service providers for which American Bank maintains accounts, such as credit accounts. The vendors are identified as "ABL Cable Co." and "Quality Cellular Phones," which have been assigned vendor identifiers 552034 and 431, respectively. The vendor identifiers may be assigned by the financial entity, the alert system, or may be absent in certain embodiments. In some embodiments, the authentication requests from the financial entities may include the vendor identifier associated with the requesting entity, such that the alert system can determine the name and contact information of the requesting entity by matching the vendor identifier in the request with data in table 600. As indicated in rows 602, 604 and 606, the stored data associated with each vendor or service provider includes contact information, which may include multiple forms of contact information for a single vendor, such as one or more e-mail addresses and/or phone numbers. The stored information may also include contact information for the financial institution. As illustrated in row 604, the table 600 may include financial institutions associated with multiple locations of a given chain store, such as Bob's Department Store (with separate identifiers for the West L.A. store location and the San Diego store location). As illustrated in the contact information for the different locations of Bob's Department Store, the table 600 includes phone numbers for store security personnel at the individual store locations. Accordingly, the alert system may be able to contact the store security to potentially apprehend a fraudster at the location where the fraud attempt occurred, such as within seconds or minutes of the fraudster submitting an application for an account.

Additional Examples

According to some embodiments, an alert system as described herein may have access to the location of a consumer via geolocation data of a consumer mobile device. For example, a consumer may authorize the alert system to receive geolocation data from a mobile device of the consumer (either via a push or pull architecture). Such geolocation data may be compared to information in authentication requests (or other requests) in order to better determine whether the consumer identified in the authentication request is the person dealing with the requesting entity. For example, the alert system may receive an authentication request from a business in Boston, Mass. for a consumer named Bartholomew Beedy. The alert system may access account information for Mr. Beedy to determine that Mr. Beedy has authorized the alert system to access geolocation data of a cell phone used by Mr. Beedy. The alert system may access the geolocation data of Mr. Beedy and determine that Mr. Beedy's location data was updated 5 minutes prior from Fresno, Calif. Thus, the alert system may determine, based on the discrepancy between the location of the transaction and the location of Mr. Beedy, that there is a high likelihood that the individual providing Mr. Beedy's information to the business in Boston, Mass. is not actually Mr. Beedy.

In one embodiment, an alert system as described herein may transmit a confirmation code, such as an alphanumerical code, bar code, or other code, to a device of the consumer and to the requesting entity. In this embodiment, the requesting entity may be required to match a confirmation code provided by the consumer to the confirmation code received from the alert system prior to proceeding with a requested transaction, such as a transaction to open an account with the requesting entity.

In some embodiments, the consumer that receives an alert may be presented with options for resolving a potentially fraudulent use of the consumer's personal information. In one embodiment, the consumer is presented with contact information for the requesting entity so that the consumer can contact the requesting entity directly. In one embodiment, the consumer is provided an option to have an alert provider take care of the fraudulent use of the consumer's identity. Depending on the embodiment, such a service by the alert provider may be offered at no cost or at a fixed or variable cost (e.g., based on how difficult it is to resolve the issue). For example, a consumer may receive an alert asking the consumer to confirm or deny whether the consumer is entering a transaction with Big Bank in Pasadena, Calif. The alert may provide options to confirm that the consumer is entering a transaction with Big Bank or deny that the consumer is entering a transaction with Big Bank and either (1) receive contact information for resolving the issue and/or (2) pay a small fee (e.g., $20-$100) to have the alert provider contact Big Bank and possibly other entities involved in the transaction to resolve the issue. As noted above, in some embodiments the consumer's reply to the alert may be communicated to the requesting entity (e.g., Big Bank) in real-time such that, if the transaction is fraudulent, the transaction may be prevented from completing, thus saving the consumer the trouble of resolving an actual transaction.

Example System Architecture

Figure 7:
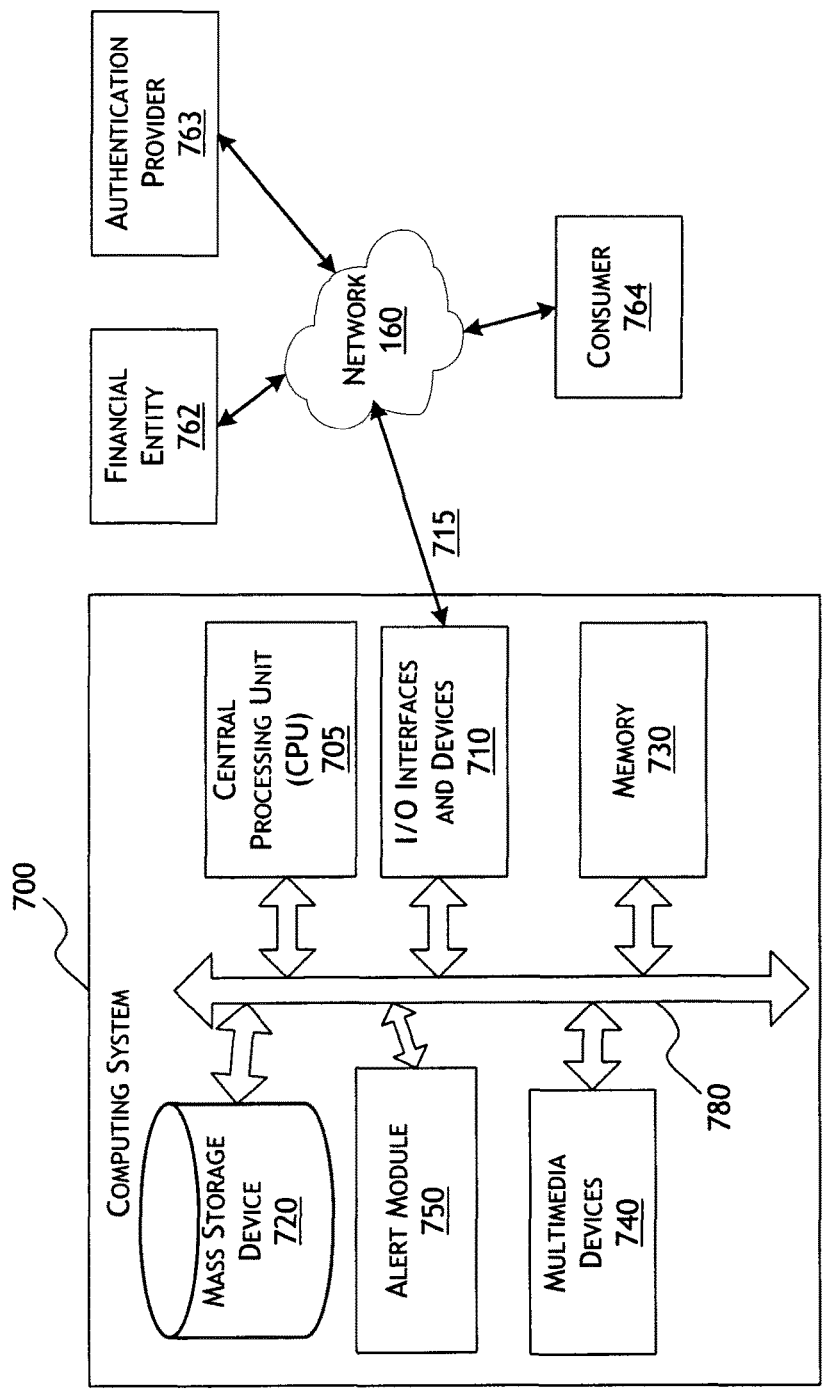
FIG. 7 illustrates one embodiment of a system that implements aspects of the present disclosure, such as providing alerts to an individual, and notifying one or more entities when an individual has not authorized an account opening.

FIG. 7 is a block diagram illustrating an example configuration for providing alerts to an individual, and notifying one or more entities when an individual has not authorized an account opening, according to certain embodiments. In the illustrated embodiment, a computing system 700, which includes an alert module 750, is in communication with a network 160 and various systems are also in communication with the network 160. The computing system 700 may be used to implement systems and methods described herein. For example, the computing system 700 may be associated with an alert delivery service that provides alerts to a user and sends notifications regarding unauthorized authentication requests to a financial institution and/or requesting entity. Alternatively, an authentication provider, credit bureau, identity monitoring service or credit monitoring service may each include a computing system similar to that of FIG. 7.

The computing system 700 includes, for example, a personal computer that is IBM, Macintosh, or Linux/Unix compatible or a server or workstation. In one embodiment, the computing system 700 comprises a server, a laptop computer, a cell phone, a personal digital assistant, a kiosk, or an audio player, for example. In one embodiment, the exemplary computing system 700 includes one or more central processing unit ("CPU") 705, which may each include a conventional or proprietary microprocessor. The computing system 700 further includes one or more memory 730, such as random access memory ("RAM") for temporary storage of information, one or more read only memory ("ROM") for permanent storage of information, and one or more mass storage device 720, such as a hard drive, diskette, solid state drive, or optical media storage device. Typically, the modules of the computing system 700 are connected to the computer using a standard based bus system 780. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 700 may be combined into fewer components and modules or further separated into additional components and modules.

The computing system 700 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 700 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 700 may include one or more commonly available input/output (I/O) devices and interfaces 710, such as a keyboard, mouse, touchpad, and printer. In one embodiment, the I/O devices and interfaces 710 include one or more display devices, such as a monitor, that allows the visual presentation of data to a user. More particularly, a display device provides for the presentation of GUIs, application software data, and multimedia presentations, for example. The computing system 700 may also include one or more multimedia devices 740, such as speakers, video cards, graphics accelerators, and microphones, for example.

In the embodiment of FIG. 7, the I/O devices and interfaces 710 provide a communication interface to various external devices. In the illustrated embodiment, the computing system 700 is electronically coupled to a network 160, which comprises one or more of a LAN, WAN, and/or the Internet, for example, via a wired, wireless, or combination of wired and wireless, communication link 715. The network 160 communicates with various computing devices and/or other electronic devices via wired or wireless communication links.

According to FIG. 7, information is provided to the computing system 700 over the network 160 from one or more data sources including, for example, the financial entity 762, authentication provider 763. The information supplied by the various data sources may include an authentication request, notification of an authentication request, a request to open an account, a request for credit data, and/or other information, such as credit data, personal information, application information, and/or other like data, for example. In addition to the devices that are illustrated in FIG. 7, the network 160 may communicate with other data sources or other computing devices, such as a requesting entity associated with the financial entity. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

A consumer computing device 764 may be connected to the network 160 and used by a user to receive and respond to alerts provided by the computing system 700. The consumer computing device 764 may be a desktop computer, a mobile computer, or any other mobile device such as a mobile phone or other similar handheld computing devices. The consumer computing device 764 may include the same or similar components to those discussed above with reference to the computing system 700.

In the embodiment of FIG. 7, the computing system 700 also includes an alert module 750 that may be stored in the mass storage device 720 as executable software codes that are executed by the CPU 705. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 7, the computing system 700 is configured to execute the alert module 750 in order to receive indication of an authentication request, identify contact information for consumers, transmit alerts to the consumers, receive feedback from the consumers regarding the provided alerts, and/or provide notification of an unauthorized authentication request or account opening request to a requesting entity, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 700, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. The methods may be executed on the computing devices in response to execution of software instructions or other executable code read from a tangible, non-transitory computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

Although this disclosure has been described in terms of certain example embodiments and applications, other embodiments and applications that are apparent to those of ordinary skill in the art, including embodiments and applications that do not provide all of the benefits described herein, are also within the scope of this disclosure.

All publications and patent applications mentioned in this specification are herein incorporated by reference in their entirety to the same extent as if each individual publication or patent application was specifically and individually indicated to be incorporated by reference.

What is claimed is:

1. A computing system, associated with one or more authentication providers, for providing alerts associated with a financial account opening transaction, the system comprising:

a data store that stores contact information associated with one or more individuals enrolled in a monitoring service; and a computing device, comprising at least one physical processor, that is in communication with the data store and that configured to:

receive by the computing device, from an authentication provider associated with the computing system, information identifying an individual for whom the authentication provider has received an authentication request from a financial entity, wherein the information identifying the individual is received in association with the financial entity receiving a request from a requesting entity, the requesting entity receiving the information in real time from a person alleging to be the individual, wherein the request is to open a financial account for the individual, wherein the requesting entity comprises a vendor or service provider or retailer having a location or place of business for which the financial entity maintains financial accounts, wherein the received information includes a vendor identifier identifying the requesting entity and wherein the person alleging to be the individual is present in real time at the location or place of business;

match, by the computing device, information stored in the data store with the information identifying the individual received in association with the authentication request;

retrieve, by the computing device, contact information associated with the individual from the data store, wherein the retrieved contact information includes at least one of a phone number or an IP address associated with a mobile device of the individual, wherein the contact information is retrieved based at least in part by the matching of the information stored in the data store with the information identifying the individual received in association with the authentication request;

retrieve, by the computing device, vendor contact information associated with the requesting entity based on the vendor identifier received from the financial entity;

send, from the computing device, an electronic notification to the mobile device of the individual based at least in part on the retrieved contact information, wherein the electronic notification provides notification to the individual that an authentication request was received regarding the individual and includes at least a vendor name from the retrieved vendor contact information, wherein the electronic notification is provided as a push alert delivered via an application executed on the mobile device, wherein the electronic notification provides the individual with a selectable option to indicate that the individual does not authorize opening of the financial account;

wherein sending the electronic notification as the push alert causes the mobile device to launch the application executed on the mobile device, wherein the application causes display of the vendor name and the selectable option to indicate that the individual does not authorize opening of the financial account;

receive, by the computing device, an indication that the individual has indicated that the individual does not authorize opening of the financial account using the selectable option in the electronic notification; and in response to receiving the indication, substantially in real time after receiving the indication, and substantially while the person is still at the location or place of business:
provproviding, from the computing device, a first notification to the financial entity indicating that the individual has not authorized opening of the financial account; and
providing, from the computing device, a second notification to the requesting entity indicating fraudulent use of identity information of the individual in association with the authentication request, wherein the second notification is provided based at least in part on the retrieved vendor contact information.

2. The computing system of claim 1, wherein the computing system is further operative to determine the requesting entity based at least in part on the financial entity.

3. The computing system of claim 2, wherein the requesting entity is determined based at least in part by retrieving data that associates the financial entity with one or more vendors or service providers associated with the financial entity.

4. The computing system of claim 1, wherein the financial account for the individual comprises a credit account.

5. The computing system of claim 1, wherein the financial entity comprises a financial institution that maintains credit accounts for a plurality of individuals on behalf of one or more vendors.

6. The computing system of claim 1, wherein the computing system is further operative to provide a default notification of approval or denial to the requesting entity when the individual does not respond to the electronic notification within a certain time period.

7. The computing system of claim 1, wherein providing the second notification to the requesting entity comprises transmitting the second notification to a POS terminal within a retail store.

8. A computer-implemented method comprising:
receiving, by one or more computing devices that are configured with specific executable instructions and that are associated with an authentication provider, information identifying an individual for whom the authentication provider has received an authentication request from a financial entity, wherein the information identifying the individual is received in association with the financial entity receiving a request from a requesting entity, the requesting entity receiving the information in real time from a person alleging to be the individual, wherein the request is to open a financial account for the individual, wherein the requesting entity comprises a vendor or service provider or retailer having a location or place of business for which the financial entity maintains financial accounts, wherein the received information includes a vendor identifier identifying the requesting entity and wherein the person alleging to be the individual is present in real time at the location or place of business;
matching, by the one or more computing devices, information stored in the data store with the information identifying the individual received in association with the authentication request;
retrieving, by the one or more computing devices associated with the authentication provider, contact information associated with the individual from a data store, wherein the retrieved contact information includes a phone number associated with a mobile device of the individual, wherein the contact information is retrieved based at least in part by the matching of the information stored in the data store with the information identifying the individual received in association with the authentication request;
retrieving, by the one or more computing devices associated with the authentication provider, vendor contact information associated with the requesting entity based on the vendor identifier received from the financial entity;
sending, by the one or more computing devices associated with the authentication provider, an electronic notification to the mobile device of the individual based at least in part on the retrieved contact information, wherein the electronic notification provides notification to the individual that an authentication request was received regarding the individual and includes at least a vendor name from the retrieved vendor contact information, wherein the electronic notification is provided as one of (a) a push alert delivered via an application executed on the mobile device or (b) a text message sent to the phone number associated with the mobile device, wherein the electronic notification provides the individual with a selectable option to indicate that the individual does not authorize opening of the financial account;
receiving, by the one or more computing devices associated with the authentication provider, an indication that the individual has indicated that the individual does not authorize opening of the financial account using the selectable option in the electronic notification; and
in response to receiving the indication, substantially in real time after receiving the indication, and substantially while the person is still at the location or place of business:
providing, by the one or more computing devices associated with the authentication provider, a first notification to the financial entity indicating that the individual has not authorized opening of the financial account; and
providing, by the one or more computing devices associated with the authentication provider, a second notification to the requesting entity indicating fraudulent use of identity information of the individual in association with the authentication request, wherein the second notification is provided based at least in part on the retrieved vendor contact information.

9. The computer-implemented method of claim 8, wherein providing the second notification to the requesting entity comprises sending an electronic message.

10. The computer-implemented method of claim 8, wherein providing the second notification to the requesting entity comprises automatically placing a phone call.

11. The computer-implemented method of claim 8, further comprising determining the requesting entity based at least in part on the financial entity.

12. The computer-implemented method of claim 11, wherein the requesting entity is determined based at least in part by retrieving data that associates the financial entity with one or more vendors or service providers associated with the financial entity.

13. The computer-implemented method of claim 8, wherein the electronic notification is sent to the individual based at least in part on a determination that the individual is enrolled in a notification service.

\* \* \* \* \*